United States Patent
Miyazawa et al.

[11] Patent Number: 6,143,062
[45] Date of Patent: Nov. 7, 2000

[54] WATER-SOLUBLE DISAZO COMPOUNDS, AQUEOUS INK COMPOSITIONS, AND COLORED ARTICLES

[75] Inventors: Takashi Miyazawa, Tokyo; Toru Tabei, Kitamoto; Isao Yamaguchi, Nagareyama; Yasuo Shirasaki, Omiya; Junko Yoshioka, Yono, all of Japan

[73] Assignee: Nippon Kayaku Kabushiki Kaisha, Tokyo, Japan

[21] Appl. No.: 09/180,967

[22] PCT Filed: Mar. 31, 1998

[86] PCT No.: PCT/JP98/01471

§ 371 Date: Dec. 21, 1998

§ 102(e) Date: Dec. 21, 1998

[87] PCT Pub. No.: WO98/44051

PCT Pub. Date: Oct. 8, 1998

[51] Int. Cl.[7] ............... C09D 11/02; C07C 245/12; C09B 31/08
[52] U.S. Cl. ............... 106/31.52; 534/823; 534/824; 534/829; 534/837
[58] Field of Search ............... 106/31.52; 534/823, 534/824, 829, 837

[56] References Cited

U.S. PATENT DOCUMENTS

| | | | |
|---|---|---|---|
| 4,295,889 | 10/1981 | Eida et al. | 106/22 |
| 4,968,784 | 11/1990 | Imai et al. | 534/797 |
| 5,225,545 | 7/1993 | Lauk | 534/829 |
| 5,256,194 | 10/1993 | Nishiwaki et al. | 106/31.52 |
| 5,281,263 | 1/1994 | Gregory et al. | 106/31.52 |
| 5,439,517 | 8/1995 | Yoshida et al. | 106/31.52 |
| 5,597,387 | 1/1997 | Bauer et al. | 8/437 |
| 5,647,897 | 7/1997 | Ouki et al. | 106/31.52 |
| 5,725,644 | 3/1998 | Sano et al. | 106/31.52 |
| 5,756,693 | 5/1998 | Kenyon et al. | 106/31.52 |
| 5,844,101 | 12/1998 | Kunde | 534/797 |

FOREIGN PATENT DOCUMENTS

| | | |
|---|---|---|
| 1 520 597 | 8/1978 | European Pat. Off. . |
| 2 144 142 | 1/1987 | United Kingdom . |

OTHER PUBLICATIONS

Derwent WPI Abstract No. JP 57036693 Week 198214B and JP87037070 Week 198735, Feb. 1982.

Derwent WPI Abstract No. JP 55151071 Week 198105B, Nov. 1980.

Derwent WPI Abstract No. JP 62156177 Week 198733 B, Jul. 1987.

Derwent WPI Abstract No. JP 1197580 Week 198938 B, Aug. 1989.

Derwent WPI Abstract No. JP 1265205 Week 198948 B, Oct. 1989.

Derwent WPI Abstract No. JP 1172907 Week 198933 B, Jul. 1989.

Derwent WPI Abstract No. JP 9230142 Week 199746 B, Sep. 1997.

"New Dye Chemistry"; Yutaka Hosoda; published by Gihodo in 1967, together with an English translation of the National Bureau of Standards dated Jan. 25, 1999 from the Taiwanese Patent Office.

*Primary Examiner*—Helene Klemanski
*Attorney, Agent, or Firm*—Nields & Lemack

[57] ABSTRACT

Are disclosed disazo compounds represented by the general formula (1):

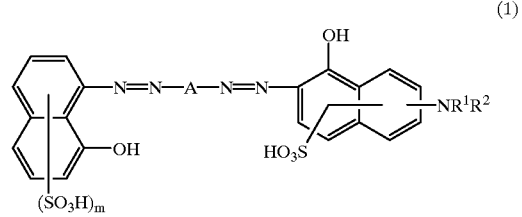

wherein A represents a phenylene or naphthylene group which may be optionally substituted; each of $R^1$ and $R^2$ represent independently a hydrogen atom, an alkyl group or a phenyl group which may be optionally substituted; and m is 1 or 2. The compounds are highly water-soluble and are stable to long term storage. Ink compositions comprising the compounds of the invention can produce a printed image with full depth of shade and are excellent in resistance to water.

16 Claims, No Drawings

WATER-SOLUBLE DISAZO COMPOUNDS, AQUEOUS INK COMPOSITIONS, AND COLORED ARTICLES

FIELD OF THE INVENTION

The present invention relates to water-soluble disazo compounds and ink compositions containing the same.

1. Prior Art

Recording with an ink jet printer is one of the typical methods for color recording. For use in ink jet printer, various ink ejecting systems have been developed. These systems are mostly designed to produce ink droplets and make them deposit on a receiving material of various kinds (paper, film, fabric and the like). This type of systems have been growing rapidly in recent years and are expected a wider use in the future due to the fact that not only these ink ejecting systems permit a soundless, silent operation of a printer by keeping a recording head in non-contact with a receiving material, but also facilitate to design a more compact printer operable with a higher speed and more easily applicable to color printing. A color print of an image or character information on the color display of a computer by means of an ink jet printer, is generally expressed by subtractive color mixture of 4 colors consisting of Yellow, Magenta, Cyan and Black. In order to make the reproduction of an image expressed by additive color mixture of colors consisting of R, G and B on a CRT display, etc. with the possible highest fidelity, the hue and the brightness are important factors. And especially, for the black color, full depth of shade is most important. In addition, ink compositions are required to have a good long-term storage stability and to produce a printed image having full depth of shade and excellent color fastness properties such as resistance to water, resistance to light and the like.

Although numerous patent applications including: Japanese Patent Publications Sho 62-37070(1987) and 61-18947 (1986); as well as Laid Open Japanese Patent Applications Sho 55-151071(1980), 57-36693(1982) and 62-156177 (1987); Hei 1-197580(1989) and 8-245894(1996) have been filed, none of them attained to satisfy completely the demand of this field of art.

2. Problems to be Solved By the Invention

The present invention is directed to water-soluble black disazo compounds, which are highly soluble in water, are stable in long-term storage, produce a printed image having full depth of shade and good color fastness properties to both light and water. The present invention also provides ink compositions containing these disazo compounds.

DISCLOSURE OF INVENTION

The inventors have concentrated on efforts to solve the problems as stated above and have attained the present invention.

More particularly, the present invention provides:

(1) a water-soluble disazo compound represented by the general formula (1) or a salt thereof:

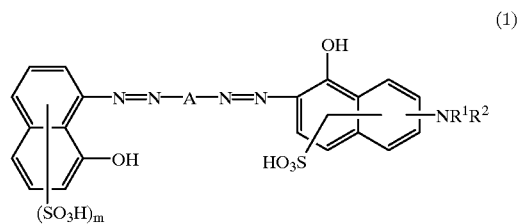

wherein A is represented by the general formula (2) or the general formula (3):

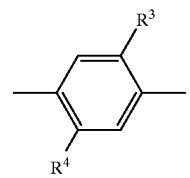

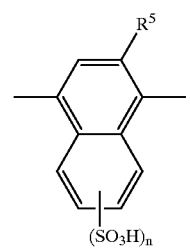

in the formula (1), each of $R^1$ and $R^2$ represent independently a hydrogen atom, a $C_1$–$C_4$ alkyl, $C_2$–$C_4$ alkanoyl or hydroxy-($C_1$–$C_4$)alkyl group, or, a phenyl, benzoyl or benzyl group which may be optionally substituted; and m is 1 or 2;

in the formula (2), each of $R^3$ and $R^4$ represents independently a hydrogen atom, or, a $C_1$–$C_4$ alkyl, $C_1$–$C_4$ alkoxy, $C_2$–$C_4$ alkanoylamino, ($C_1$–$C_4$)alkoxy-($C_2$–$C_4$)alkanoylamino, ($C_1$–$C_4$)alkoxy-($C_1$–$C_4$)alkoxy or ureido group: and in the formula (3), $R^5$ represents a hydrogen atom, or, a $C_1$–$C_4$ alkyl or $C_1$–$C_4$ alkoxy group; and n is 0 or 1;

(2) the salt of disazo compound as defined in (1), wherein the salt is lithium salt, sodium salt, potassium salt or ammonium salt represented by the general formula (4):

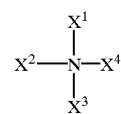

wherein each of $X^1$ to $X^4$ represents independently a hydrogen atom, or, a $C_1$–$C_4$ alkyl, hydroxy-($C_1$–$C_4$) alkyl or hydroxyethoxy-($C_1$–$C_4$)alkyl group;

(3) the disazo compound or the salt thereof as defined in (1) or (2), wherein when A in the general formula (1) is represented by the general formula (2), then m is 2; $R^1$ and $R^2$ represent a hydrogen atom; $R^3$ represents a hydrogen atom, or, a methoxy, ethoxy, propoxy or butoxy group; and $R^4$ represents a hydrogen atom, or, a methyl, ethyl, propyl, butyl, methoxy, ethoxy, propoxy, butoxy, acetylamino, propionylamino or butyloylamino group;

(4) the disazo compound or the salt thereof as defined in (1) or (2), wherein when A in the formula (1) is represented by the general formula (2), then m is 2; $R^1$ represents a hydrogen atom; $R^2$ represents a phenyl, benzoyl or benzyl group which may be optionally substituted; $R^3$ represents a hydrogen atom, or, a methoxy, ethoxy, propoxy or butoxy group; and $R^4$ represents a hydrogenatom, or, a methyl, ethyl, propyl, butyl, methoxy, ethoxy, propoxy, butoxy, acetylamino, propionylamino or butyloylamino group;

(5) the disazo compound or the salt thereof as defined in (1) or (2), wherein when A in the formula (1) is represented by the general formula (2), m is 2; $R^1$ and $R^2$ represent independently a hydrogen atom; $R^3$ represents a methoxymethoxy, methoxyethoxy, methoxypropoxy, methoxybutoxy, ethoxymethoxy, ethoxyethoxy, ethoxypropoxy or ethoxybutoxy group; and $R^4$ represents an acetylamino, propionylamino or butyloylamino group;

(6) the disazo compound or the salt thereof as defined in (1) or (2), wherein when A in the formula (1) is represented by the general formula (2), then m is 2; $R^1$ represents a hydrogen atom; $R^2$ represents a phenyl, benzoyl or benzyl group which may be optionally substituted; $R^3$ represents a methoxymethoxy, methoxyethoxy, methoxypropoxy, methoxybutoxy, ethoxymethoxy, ethoxyethoxy, ethoxypropoxy, ethoxybutoxy, n-propoxypropoxy, i-propoxybutoxy or n-propoxybutoxy group; and $R^4$ represents an acetylamino, propionylamino or butyloylamino group;

(7) the disazo compound or the salt thereof as defined in (1) or (2), wherein when A in the formula (1) is represented by the general formula (3), then m is 2; $R^1$ and $R^2$ represent independently a hydrogen atom; $R^5$ represents a hydrogen atom; and n is 1;

(8) the disazo compound or the salt thereof as defined in (1) or (2), wherein when A is represented by the general formula (3), then m is 2; $R^1$ represents a hydrogen atom; $R^2$ represents a phenyl, benzoyl or benzyl group which may be optionally substituted; $R^5$ represents a hydrogen atom; and n is 1;

(9) an aqueous ink composition containing the disazo compound or the salt thereof as defined in any one of (1) to (8);

(10) a colored article colored with the disazo compound or the salts thereof as defined in any one of (1) to (8): and

(11) the colored article as defined in (10), which was colored by means of a printer.

Unless otherwise designated, the sulfo group and carboxyl group are represented in the form of a free acid.

DETAILED DESCRIPTION OF INVENTION

The present invention will now be described in more detail. In the general formula (1), $C_1$–$C_4$ alkyl groups include methyl, ethyl, n-propyl, i-propyl, n-butyl, i-butyl, secondary butyl, tertiary butyl and the like, with methyl and ethyl being preferred. $C_2$–$C_4$ alkanoyl groups include acetyl, n-propionyl, i-propionyl, hydroxyacetyl, 2- or 3-hydroxy-n-propionyl, butyloyl and the like, with acetyl or n-propionyl being particularly preferred.

Hydroxy-($C_1$–$C_4$)alkyl groups include hydroxymethyl, hydroxyethyl, hydroxy-n-propyl, hydroxy-i-propyl, hydroxy-n-butyl, hydroxy-i-butyl, hydroxy secondary butyl, hydroxy tertiary butyl and the like, with hydroxyethyl being preferred.

$C_1$–$C_4$ alkoxy groups include methoxy, ethoxy, n-propoxy, i-propoxy, n-butoxy, i-butoxy, secondary butoxy, tertiary butoxy and the like, with methoxy and ethoxy being preferred. Methoxy is particularly preferred.

($C_1$–$C_4$)alkoxy-($C_1$–$C_4$)alkoxy groups include methoxymethoxy, methoxyethoxy, methoxypropoxy, methoxybutoxy, ethoxymethoxy, ethoxyethoxy, ethoxypropoxy, ethoxybutoxy, n-propoxypropoxy, i-propoxybutoxy, n-propoxybutoxy and the like, with methoxyethoxy and ethoxyethoxy being preferred.

($C_2$–$C_4$)alkanoylamino groups include acetylamino, n-propionylamino, i-propionylamino, hydroxyacetylamino, 2- or 3-hydroxy-n-propionylamino, butyloylamino and the like, among which acetylamino is particularly preferred.

($C_1$–$C_4$)alkoxy-($C_2$–$C_4$)alkanoylamino groups include methoxypropionylamino and ethoxypropionylamino, with methoxypropionylamino being preferred. Examples of the substituents on the optionally substituted phenyl, benzoyl or benzyl group may be $C_1$–$C_4$ alkyl, $C_1$–$C_4$ alkoxy, amino, acylamino, hydroxyl, halogen, sulfo or carboxyl. The sulfo group and the carboxyl group may be in the form of a salt. Phenyl, benzoyl or benzyl groups are preferably unsubstituted or substituted with a sulfo or carboxyl group.

Halogen is selected from fluorine, chlorine, bromine and iodine, among which chlorine and bromine are particularly preferred.

Salts of the compounds represented by the general formula (1) of the present invention are salts of inorganic or organic cation. Suitable inorganic salts are alkaline metal salts and alkaline earth metal salts. Inorganic salts which can be preferably used are salts of lithium and sodium. Suitable organic salts are ammonium salts represented by the general formula (4):

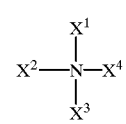

(4)

wherein each of $X^1$ to $X^4$ represents independently a hydrogen atom, or, a $C_1$–$C_4$ alkyl, hydroxy-($C_1$–$C_4$)alkyl or hydroxyethoxy-($C_1$–$C_4$)alkyl group.

Examples of $C_1$–$C_4$ alkyl groups are those as defined above. Examples of hydroxy-($C_1$–$C_4$)alkyl groups are hydroxymethyl, hydroxyethyl, 3-hydroxypropyl, 2-hydroxypropyl, 4-hydroxybutyl, 3-hydroxybutyl, 2-hydroxybutyl and the like. Examples of hydroxyethoxy-($C_1$–$C_4$)alkyl groups are hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl, 2-hydroxyethoxybutyl and the like.

Examples of the ammonium salts represented by the general formula(4) are shown in Table 1.

TABLE 1

General formula (4)

| Compd. No. | $X^1$ | $X^2$ | $X^3$ | $X^4$ |
|---|---|---|---|---|
| 4-1 | H | —$C_2H_4OH$ | —$C_2H_4OH$ | —$C_2H_4OH$ |
| 4-2 | $CH_3$ | —$C_2H_4OH$ | —$C_2H_4OH$ | —$C_2H_4OH$ |
| 4-3 | H | —$CH_2CH(OH)CH_3$ | —$CH_2CH(OH)CH_3$ | —$CH_2CH(OH)CH_3$ |
| 4-4 | $CH_3$ | —$CH_2CH(OH)CH_3$ | —$CH_2CH(OH)CH_3$ | —$CH_2CH(OH)CH_3$ |
| 4-5 | H | —$C_2H_4OH$ | H | —$C_2H_4OH$ |
| 4-6 | $CH_3$ | —$C_2H_4OH$ | H | —$C_2H_4OH$ |
| 4-7 | H | —$CH_2CH(OH)CH_3$ | H | —$CH_2CH(OH)CH_3$ |
| 4-8 | $CH_3$ | —$CH_2CH(OH)CH_3$ | H | —$CH_2CH(OH)CH_3$ |
| 4-9 | $CH_3$ | —$C_2H_4OH$ | $CH_3$ | —$C_2H_4OH$ |
| 4-10 | $CH_3$ | —$CH_2CH(OH)CH_3$ | $CH_3$ | —$CH_2CH(OH)CH_3$ |

Disazo compounds represented by the general formula (1) can be prepared by the known method per se. By way of an example, a compound of the general formula (5):

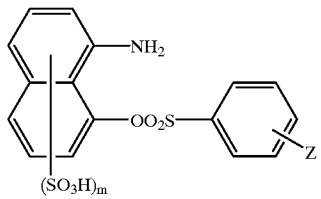

(5)

wherein Z represents for example a hydrogen atom or a $C_1$–$C_4$ alkyl group which can be substituted at an optional position of the benzene ring; m is 1 or 2; and the $SO_3H$ group may be used in salt form, is subjected to diazotization, followed by coupling reaction with a compound represented by the general formula (6):

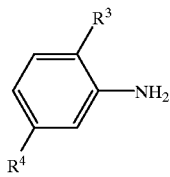

(6)

or the general formula (7):

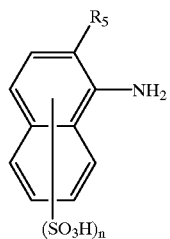

(7)

wherein $R^3$, $R^4$, $R^5$ and n are as defined above, to produce a monoazo compound represented by the general formula (8):

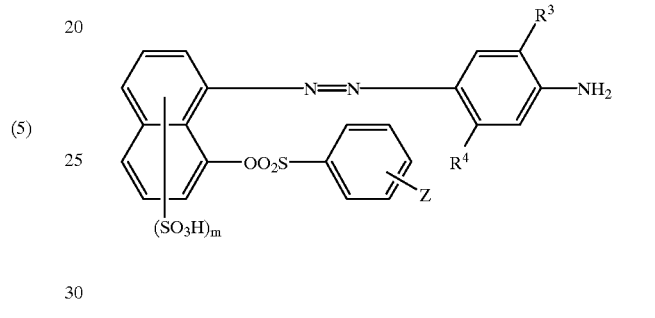

(8)

or the general formula (9):

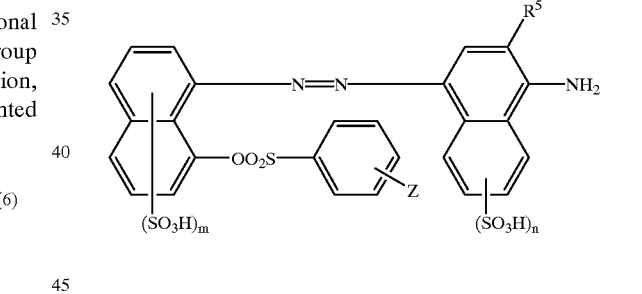

(9)

wherein $R^3$, $R^4$, $R^5$, m and n are as defined above. This coupling reaction can be conducted preferably in an aqueous medium at a temperature of usually 0 to 60° C., preferably 5 to 30° C., at a pH value of usually 2 to 12, preferably 3 to 8. Then, the monoazo compound of the general formula (8) or (9) is subjected to diazotization, followed by coupling reaction with a compound represented by the general formula (10):

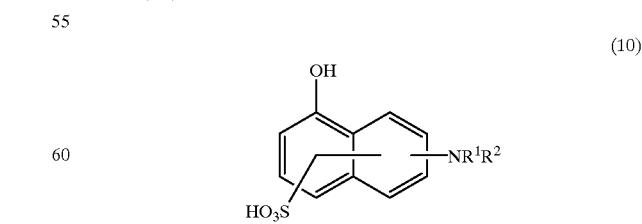

(10)

wherein $R^1$ and $R^2$ are as defined above, to obtain a disazo compound represented by the general formula (11):

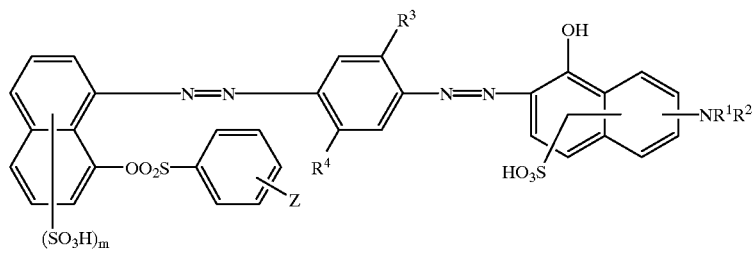

(11)

or general formula (12):

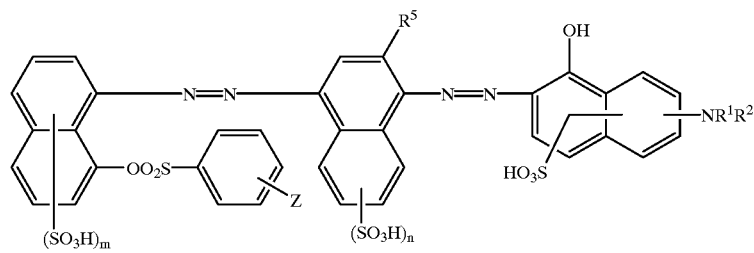

(12)

wherein $R^1$, $R^2$, $R^3$, $R^4$, $R^5$, m and n are as defined above. This coupling reaction can be conducted preferably at a pH value of 7 to 12, more preferably 8 to 10.

Hydrolysis of a compound of the general formula (11) or (12) for producing a compound of the general formula (1) can be performed by known methods per se. Hydrolysis can be advantageously conducted by heating the starting material in an aqueous alkaline medium. For instance, the solution of a compound of the general formula (11) is adjusted to a pH value of 10 or more by adding sodium hydroxide or potassium hydroxide thereto, and then is heated to a temperature of usually 20 to 150° C., preferably 30 to 100° C. At the end of the heating, the reaction solution is kept at a pH value of 10 to 12, to yield a black disazo compound represented by the general formula (13):

(13)

wherein $R^1$, $R^2$, $R^3$, $R^4$, $R^5$, m and n are as defined above.

Compounds of the general formula (12) can also be subjected to hydrolysis in the same way as the compounds of the general formula (11), to obtain a black disazo compound represent by the general formula (14):

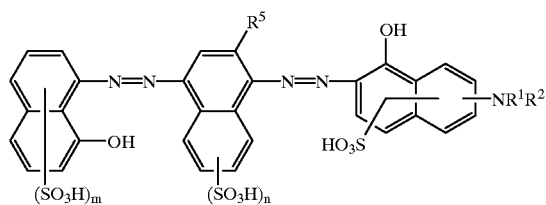

(14)

wherein $R^1$, $R^2$, $R^3$, $R^4$, $R^5$, m and n are as defined above. Compounds of the general formula (5) can be obtained by allowing the corresponding hydroxyaminosulfonic acid to react with a benzene sulfonyl halide derivative, preferably a benzene sulfonyl chloride derivative, according to conventional procedure.

After hydrolytic reaction, disazo compounds of the general formula (1) of the present invention or the salts thereof (unless otherwise noticed, disazo compounds and the salts thereof are hereinafter referred to simply as "disazo compounds") can be isolated in the form of a free acid by adding a mineral acid. The resulting inorganic salts can be removed therefrom by washing with water or with acidified water. Then, the dyestuffs in free acid form having a low salt content obtained in the manner as described just above can be neutralized in an aqueous medium with the aid of a hydroxide and/or carbonate such as LiOH, $Li_2CO_3$, NaOH, $Na_2CO_3$ or $K_2CO_3$ or an amine represented by the above general formula (4) to obtain the corresponding salt solution. Preferred amines which may be mentioned are ammonia, ethanolamine, diethanolamine, triethanolamine, N-methyl-N-ethanolamine, N-methyl-N,N-diethanolamine, 2-(2-hydroxyethoxy)-ethylamine, di-2-(2-hydroxyethoxy)-ethylamine, tri-2-(2-hydroxyethoxy)-ethylamine and the like.

When disazo compounds of the general formula (1) are expressed as B—N=N—A—N=N—C, the groups which are represented by the letters "A", "B" and "C" are exemplified in Tables 2 to 58.

TABLE 2

| Compound No. | B | A | C |
|---|---|---|---|
| 1001 | 3-sulfo-8-hydroxy-5-methylnaphthalene | 1,4-phenylene | 1-hydroxy-2-methyl-3-sulfo-8-amino-naphthalene |
| 1002 | 3-sulfo-8-hydroxy-5-methylnaphthalene | 1,4-phenylene | 1-hydroxy-2-methyl-3-sulfo-7-amino-naphthalene |
| 1003 | 3-sulfo-8-hydroxy-5-methylnaphthalene | 1,4-phenylene | 1-hydroxy-2-methyl-3-sulfo-6-amino-naphthalene |
| 1004 | 3-sulfo-8-hydroxy-5-methylnaphthalene | 1,4-phenylene | 1-hydroxy-2-methyl-4-amino-5-sulfo-naphthalene |
| 1005 | 3-sulfo-8-hydroxy-5-methylnaphthalene | 1,4-phenylene | 1-hydroxy-2-methyl-4-amino-6-sulfo-naphthalene |
| 1006 | 3-sulfo-8-hydroxy-5-methylnaphthalene | 2-methyl-1,4-phenylene | 1-hydroxy-2-methyl-3-sulfo-7-amino-naphthalene |
| 1007 | 3-sulfo-8-hydroxy-5-methylnaphthalene | 2-methyl-1,4-phenylene | 1-hydroxy-2-methyl-3-sulfo-6-amino-naphthalene |

TABLE 3

| Compound No. | B | A | C |
|---|---|---|---|
| 1008 | 3-sulfo-8-hydroxy-4-methylnaphthalene | 2,4-dimethylphenyl | 6-amino-1-hydroxy-2-methyl-3-sulfonaphthalene (NH₂) |
| 1009 | 3-sulfo-8-hydroxy-4-methylnaphthalene | 2,4-dimethylphenyl | 6-(methylamino)-1-hydroxy-2-methyl-3-sulfonaphthalene (NHCH₃) |
| 1010 | 3-sulfo-8-hydroxy-4-methylnaphthalene | 2,4-dimethylphenyl | 6-(phenylamino)-1-hydroxy-2-methyl-3-sulfonaphthalene (NHPh) |
| 1011 | 3-sulfo-8-hydroxy-4-methylnaphthalene | 2,4-dimethylphenyl | 6-[(3-sulfophenyl)amino]-1-hydroxy-2-methyl-3-sulfonaphthalene |
| 1012 | 3-sulfo-8-hydroxy-4-methylnaphthalene | 2,4-dimethylphenyl | 6-[(4-carboxyphenyl)amino]-1-hydroxy-2-methyl-3-sulfonaphthalene |
| 1013 | 3-sulfo-8-hydroxy-4-methylnaphthalene | 2,4-dimethylphenyl | 6-(benzoylamino)-1-hydroxy-2-methyl-3-sulfonaphthalene (NHCOPh) |
| 1014 | 3-sulfo-8-hydroxy-4-methylnaphthalene | 2,4-dimethylphenyl | 6-(benzylamino)-1-hydroxy-2-methyl-3-sulfonaphthalene (NHCH₂Ph) |

TABLE 3-continued
| Compound No. | B | A | C |
|---|---|---|---|
| 1015 | 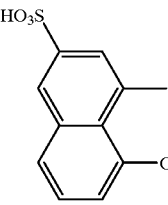 | 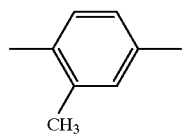 | 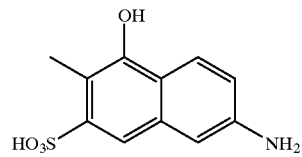 |
| 1016 | 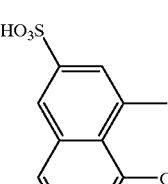 | 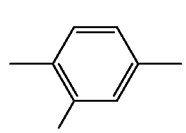 | 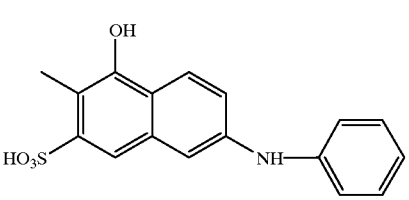 |
| 1017 | 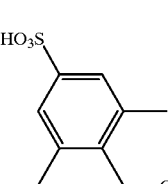 | 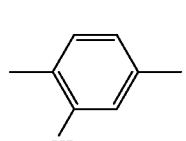 | 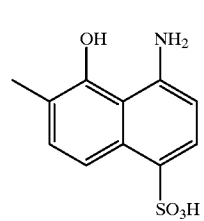 |
TABLE 4
| Compound No. | B | A | C |
|---|---|---|---|
| 1018 | | | |
| 1019 | | | |
| 1020 | | | |

TABLE 4-continued

| Compound No. | B | A | C |
|---|---|---|---|
| 1021 | 3-methyl-4-hydroxy-6-sulfo naphthalene (HO3S, CH3, OH on naphthalene) | 2-methoxy-4,5-dimethyl benzene (OCH3, CH3, CH3) | 1-hydroxy-2-methyl-6-(3-sulfophenylamino)-3-sulfonaphthalene (OH, CH3, NH-C6H4-SO3H, HO3S) |
| 1022 | same as 1021 | same as 1021 | 1-hydroxy-2-methyl-6-(4-carboxyphenylamino)-3-sulfonaphthalene (OH, CH3, NH-C6H4-COOH, HO3S) |
| 1023 | same as 1021 | same as 1021 | 1-hydroxy-2-methyl-6-(benzoylamino)-3-sulfonaphthalene (OH, CH3, NHCO-C6H5, HO3S) |
| 1024 | same as 1021 | same as 1021 | 1-hydroxy-2-methyl-6-(benzylamino)-3-sulfonaphthalene (OH, CH3, NHCH2-C6H5, HO3S) |
| 1025 | same as 1021 | same as 1021 | 1-hydroxy-2-methyl-6-amino-3-sulfonaphthalene (OH, CH3, NH2, HO3S) |
| 1026 | same as 1021 | same as 1021 | 1-hydroxy-2-methyl-6-(phenylamino)-3-sulfonaphthalene (OH, CH3, NH-C6H5, HO3S) |
| 1027 | same as 1021 | same as 1021 | 1-hydroxy-2-methyl-4-amino-5-sulfonaphthalene (OH, CH3, NH2, SO3H) |

TABLE 5

| Compound No. | B | A | C |
|---|---|---|---|
| 1028 | 3-HO₃S, 8-methyl, 5-OH naphthalene | 4-OCH₃, 2,5-dimethyl, NHCOCH₃ phenyl | 1-OH, 2-methyl, 3-SO₃H, 6-NH₂ naphthalene |
| 1029 | 3-HO₃S, 8-methyl, 5-OH naphthalene | 4-OCH₃, 2,5-dimethyl, NHCOCH₃ phenyl | 1-OH, 2-methyl, 3-SO₃H, 6-NHCH₃ naphthalene |
| 1030 | 3-HO₃S, 8-methyl, 5-OH naphthalene | 4-OCH₃, 2,5-dimethyl, NHCOCH₃ phenyl | 1-OH, 2-methyl, 3-SO₃H, 6-NHPh naphthalene |
| 1031 | 3-HO₃S, 8-methyl, 5-OH naphthalene | 4-OCH₃, 2,5-dimethyl, NHCOCH₃ phenyl | 1-OH, 2-methyl, 3-SO₃H, 6-NH(3-SO₃H-phenyl) naphthalene |
| 1032 | 3-HO₃S, 8-methyl, 5-OH naphthalene | 4-OCH₃, 2,5-dimethyl, NHCOCH₃ phenyl | 1-OH, 2-methyl, 3-SO₃H, 6-NH(4-COOH-phenyl) naphthalene |
| 1033 | 3-HO₃S, 8-methyl, 5-OH naphthalene | 4-OCH₃, 2,5-dimethyl, NHCOCH₃ phenyl | 1-OH, 2-methyl, 3-SO₃H, 6-NHCOPh naphthalene |
| 1034 | 3-HO₃S, 8-methyl, 5-OH naphthalene | 4-OCH₃, 2,5-dimethyl, NHCOCH₃ phenyl | 1-OH, 2-methyl, 3-SO₃H, 6-NHCH₂Ph naphthalene |

TABLE 5-continued
| Compound No. | B | A | C |
|---|---|---|---|
| 1035 | 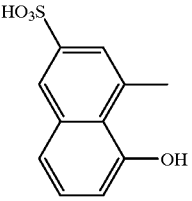 | 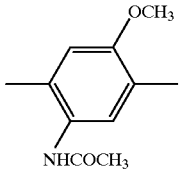 | 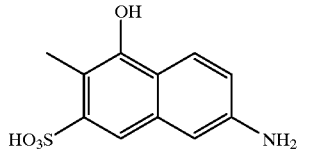 |
| 1036 | 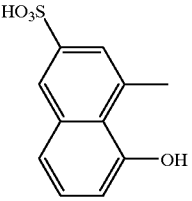 | 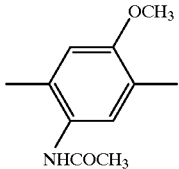 | 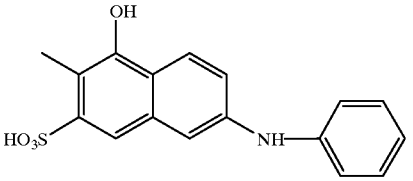 |
| 1037 | 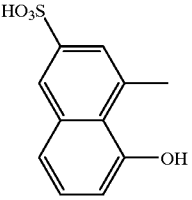 | 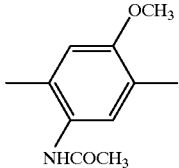 | 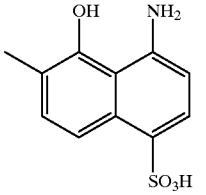 |
TABLE 6
| Compound No. | B | A | C |
|---|---|---|---|
| 1038 | 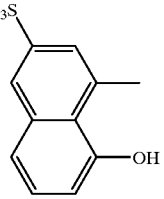 | 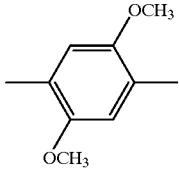 | 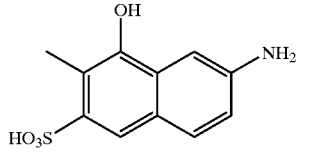 |
| 1039 | 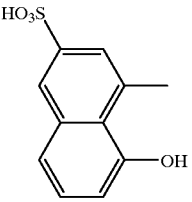 | 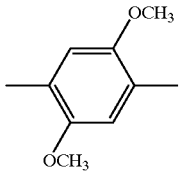 | 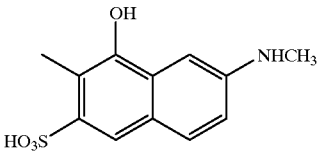 |
| 1040 | 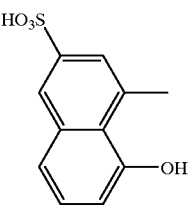 | 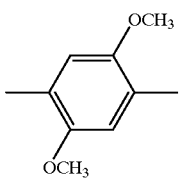 | 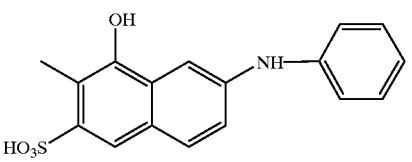 |

TABLE 6-continued

| Compound No. | B | A | C |
| --- | --- | --- | --- |
| 1041 | 6-sulfo-8-methyl-1-naphthol-3-sulfonic acid structure | 1,4-dimethoxy-2,5-dimethylbenzene | 1-hydroxy-2-methyl-6-((3-sulfophenyl)amino)naphthalene-3-sulfonic acid |
| 1042 | same B | same A | 1-hydroxy-2-methyl-6-((4-carboxyphenyl)amino)naphthalene-3-sulfonic acid |
| 1043 | same B | same A | 1-hydroxy-2-methyl-6-(benzoylamino)naphthalene-3-sulfonic acid |
| 1044 | same B | same A | 1-hydroxy-2-methyl-6-(benzylamino)naphthalene-3-sulfonic acid |
| 1045 | same B | same A | 1-hydroxy-2-methyl-6-amino-naphthalene-3-sulfonic acid |
| 1046 | same B | same A | 1-hydroxy-2-methyl-6-(phenylamino)naphthalene-3-sulfonic acid |
| 1047 | same B | same A | 1-hydroxy-2-methyl-5-amino-naphthalene-8-sulfonic acid |

TABLE 7
| Compound No. | B | A | C |
|---|---|---|---|
| 1048 | 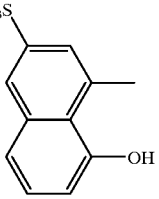 | 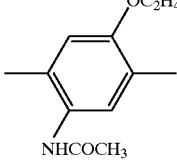 | 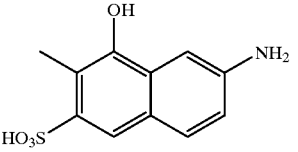 |
| 1049 | 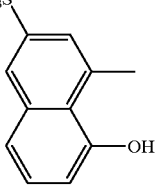 | 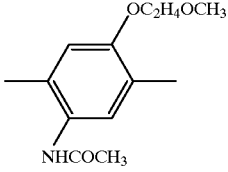 | 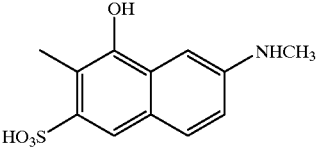 |
| 1050 | 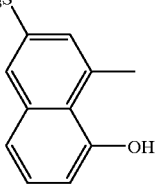 | 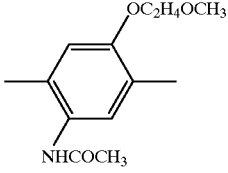 | 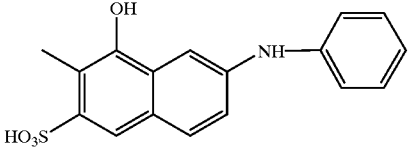 |
| 1051 | 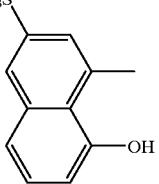 | 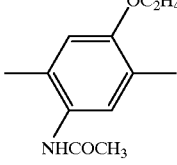 | 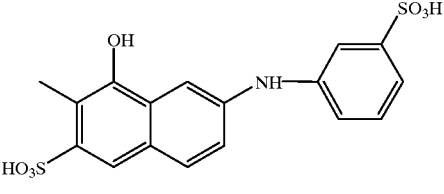 |
| 1052 | 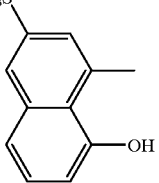 | 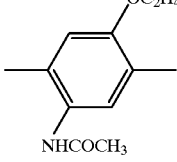 | 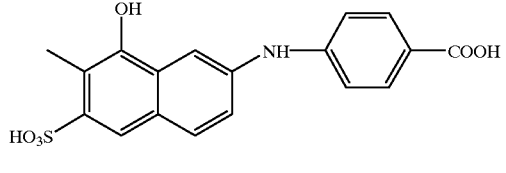 |
| 1053 | 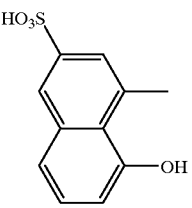 | 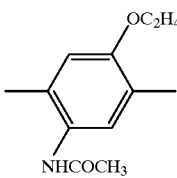 | 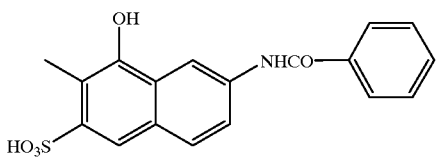 |
| 1054 | 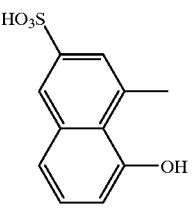 | 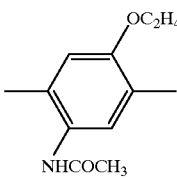 | 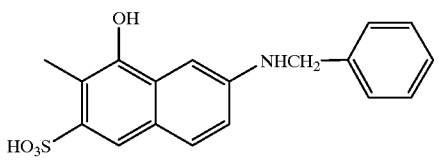 |

TABLE 7-continued

| Compound No. | B | A | C |
|---|---|---|---|
| 1055 | 3-methyl-8-hydroxynaphthalene-6-sulfonic acid | 4-acetamido-2,5-dimethyl-1-(2-methoxyethoxy)benzene | 6-amino-1-hydroxy-2-methylnaphthalene-3-sulfonic acid |
| 1056 | 3-methyl-8-hydroxynaphthalene-6-sulfonic acid | 4-acetamido-2,5-dimethyl-1-(2-methoxyethoxy)benzene | 1-hydroxy-2-methyl-6-(phenylamino)naphthalene-3-sulfonic acid |
| 1057 | 3-methyl-8-hydroxynaphthalene-6-sulfonic acid | 4-acetamido-2,5-dimethyl-1-(2-methoxyethoxy)benzene | 4-amino-5-hydroxy-6-methylnaphthalene-1-sulfonic acid |

TABLE 8

| Compound No. | B | A | C |
|---|---|---|---|
| 1058 | 4-methyl-5-hydroxynaphthalene-1-sulfonic acid | 2,5-dimethyl-1,4-disubstituted benzene (with CH₃) | 7-amino-1-hydroxy-2-methylnaphthalene-3-sulfonic acid |
| 1059 | 4-methyl-5-hydroxynaphthalene-1-sulfonic acid | 2,5-dimethyl-1,4-disubstituted benzene (with CH₃) | 1-hydroxy-2-methyl-7-(methylamino)naphthalene-3-sulfonic acid |
| 1060 | 4-methyl-5-hydroxynaphthalene-1-sulfonic acid | 2,5-dimethyl-1,4-disubstituted benzene (with CH₃) | 1-hydroxy-2-methyl-7-(phenylamino)naphthalene-3-sulfonic acid |

TABLE 8-continued
| Compound No. | B | A | C |
|---|---|---|---|
| 1061 | 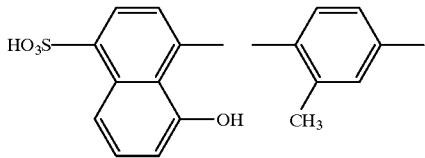 | 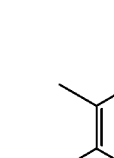 | 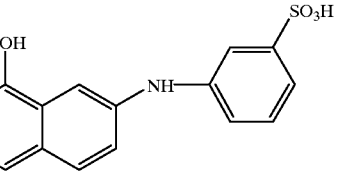 |
| 1062 | 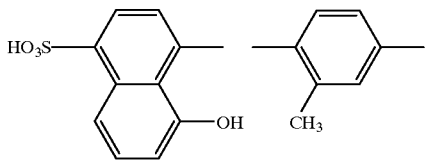 | 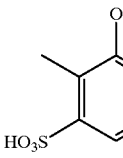 | 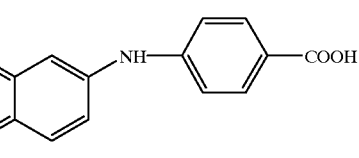 |
| 1063 | 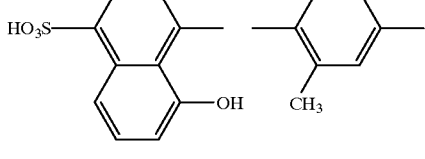 | 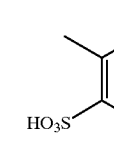 | 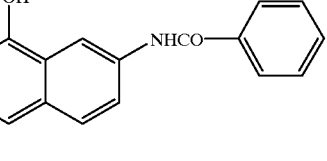 |
| 1064 | 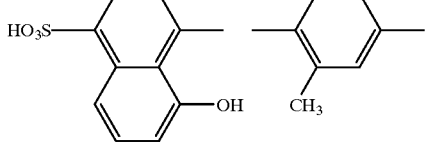 | 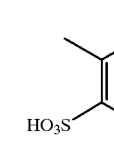 | 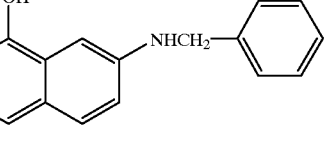 |
| 1065 | 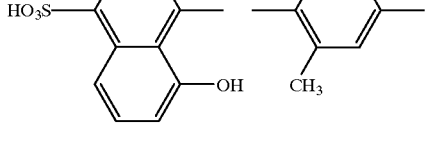 | 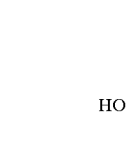 | 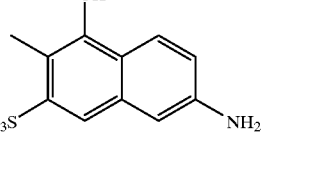 |
| 1066 | 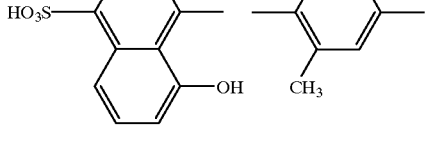 | 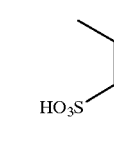 | 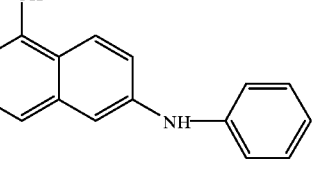 |
| 1067 | 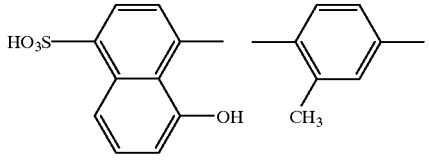 |  | 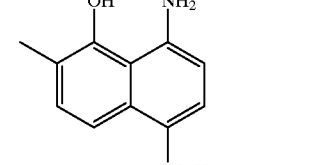 |

TABLE 9
| Compound No. | B | A | C |
|---|---|---|---|
| 1068 | 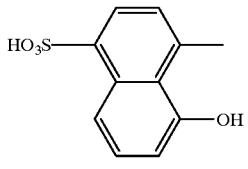 | 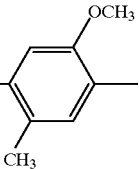 | 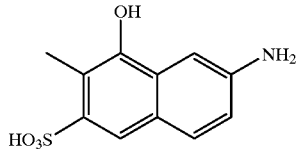 |
| 1069 | 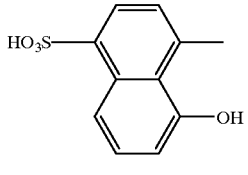 | 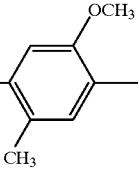 | 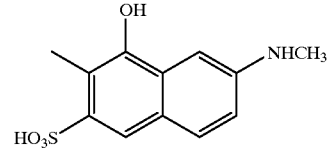 |
| 1070 | 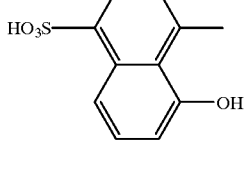 | 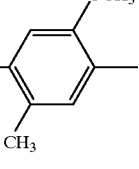 | 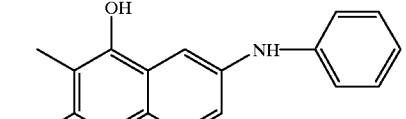 |
| 1071 | 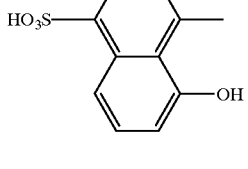 | 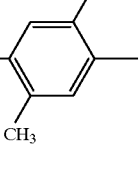 | 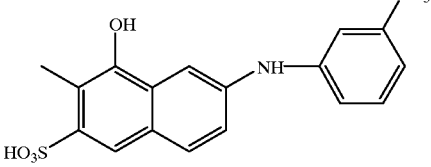 |
| 1072 | 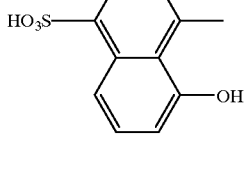 | 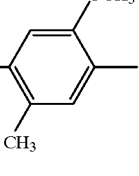 | 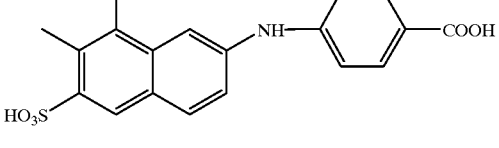 |
| 1073 | 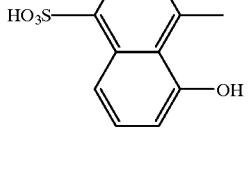 | 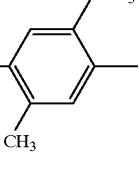 | 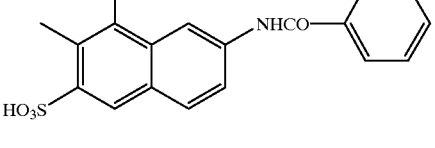 |
| 1074 | 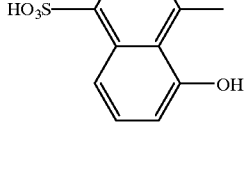 | 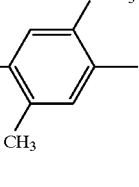 | 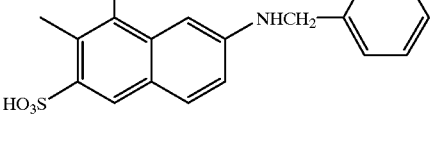 |
| 1075 | 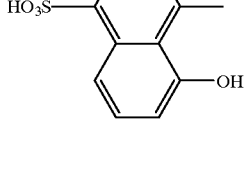 | 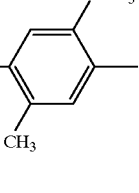 | 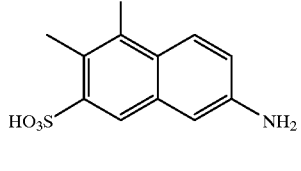 |

TABLE 9-continued

| Compound No. | B | A | C |
|---|---|---|---|
| 1076 | 5-HO₃S, 8-CH₃, 1-OH naphthalene | 2-OCH₃, 4,5-diCH₃ benzene | 1-OH, 2-CH₃, 3-SO₃H, 6-NHPh naphthalene |
| 1077 | 5-HO₃S, 8-CH₃, 1-OH naphthalene | 2-OCH₃, 4,5-diCH₃ benzene | 5-OH, 4-NH₂, 6-CH₃, 1-SO₃H naphthalene |

TABLE 10

| Compound No. | B | A | C |
|---|---|---|---|
| 1078 | 5-HO₃S, 8-CH₃, 1-OH naphthalene | 2-OCH₃, 5-NHCOCH₃, 4-CH₃ benzene | 1-OH, 2-CH₃, 3-SO₃H, 6-NH₂ naphthalene |
| 1079 | 5-HO₃S, 8-CH₃, 1-OH naphthalene | 2-OCH₃, 5-NHCOCH₃, 4-CH₃ benzene | 1-OH, 2-CH₃, 3-SO₃H, 6-NHCH₃ naphthalene |
| 1080 | 5-HO₃S, 8-CH₃, 1-OH naphthalene | 2-OCH₃, 5-NHCOCH₃, 4-CH₃ benzene | 1-OH, 2-CH₃, 3-SO₃H, 6-NHPh naphthalene |
| 1081 | 5-HO₃S, 8-CH₃, 1-OH naphthalene | 2-OCH₃, 5-NHCOCH₃, 4-CH₃ benzene | 1-OH, 2-CH₃, 3-SO₃H, 6-NH(3-SO₃H-phenyl) naphthalene |

TABLE 10-continued

| Compound No. | B | A | C |
|---|---|---|---|
| 1082 | 5-HO3S, 8-methyl, 1-OH naphthalene | 4-OCH3, 2,5-dimethyl, NHCOCH3 benzene | 1-OH, 2-methyl, 3-SO3H, 7-(NH-C6H4-COOH) naphthalene |
| 1083 | 5-HO3S, 8-methyl, 1-OH naphthalene | 4-OCH3, 2,5-dimethyl, NHCOCH3 benzene | 1-OH, 2-methyl, 3-SO3H, 7-(NHCO-C6H5) naphthalene |
| 1084 | 5-HO3S, 8-methyl, 1-OH naphthalene | 4-OCH3, 2,5-dimethyl, NHCOCH3 benzene | 1-OH, 2-methyl, 3-SO3H, 7-(NHCH2-C6H5) naphthalene |
| 1085 | 5-HO3S, 8-methyl, 1-OH naphthalene | 4-OCH3, 2,5-dimethyl, NHCOCH3 benzene | 1-OH, 2-methyl, 3-SO3H, 6-NH2 naphthalene |
| 1086 | 5-HO3S, 8-methyl, 1-OH naphthalene | 4-OCH3, 2,5-dimethyl, NHCOCH3 benzene | 1-OH, 2-methyl, 3-SO3H, 6-NH-C6H5 naphthalene |
| 1087 | 5-HO3S, 8-methyl, 1-OH naphthalene | 4-OCH3, 2,5-dimethyl, NHCOCH3 benzene | 5-OH, 6-methyl, 4-NH2, 1-SO3H naphthalene |

TABLE 11

| Compound No. | B | A | C |
|---|---|---|---|
| 1088 | 4-methyl-5-hydroxynaphthalene-1-sulfonic acid | 1,4-dimethoxy-2,5-dimethylbenzene | 6-amino-1-hydroxy-2-methyl-3-sulfonaphthalene |
| 1089 | 4-methyl-5-hydroxynaphthalene-1-sulfonic acid | 1,4-dimethoxy-2,5-dimethylbenzene | 1-hydroxy-2-methyl-6-(methylamino)-3-sulfonaphthalene |
| 1090 | 4-methyl-5-hydroxynaphthalene-1-sulfonic acid | 1,4-dimethoxy-2,5-dimethylbenzene | 6-anilino-1-hydroxy-2-methyl-3-sulfonaphthalene |
| 1091 | 4-methyl-5-hydroxynaphthalene-1-sulfonic acid | 1,4-dimethoxy-2,5-dimethylbenzene | 1-hydroxy-2-methyl-6-(3-sulfoanilino)-3-sulfonaphthalene |
| 1092 | 4-methyl-5-hydroxynaphthalene-1-sulfonic acid | 1,4-dimethoxy-2,5-dimethylbenzene | 6-(4-carboxyanilino)-1-hydroxy-2-methyl-3-sulfonaphthalene |
| 1093 | 4-methyl-5-hydroxynaphthalene-1-sulfonic acid | 1,4-dimethoxy-2,5-dimethylbenzene | 6-benzamido-1-hydroxy-2-methyl-3-sulfonaphthalene |
| 1094 | 4-methyl-5-hydroxynaphthalene-1-sulfonic acid | 1,4-dimethoxy-2,5-dimethylbenzene | 6-benzylamino-1-hydroxy-2-methyl-3-sulfonaphthalene |
| 1095 | 4-methyl-5-hydroxynaphthalene-1-sulfonic acid | 1,4-dimethoxy-2,5-dimethylbenzene | 7-amino-1-hydroxy-2-methyl-3-sulfonaphthalene |

TABLE 11-continued
| Compound No. | B | A | C |
|---|---|---|---|
| 1096 | 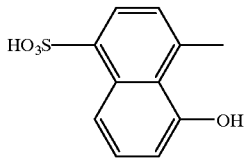 | 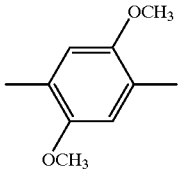 | 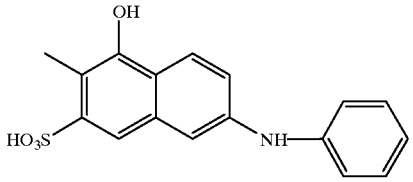 |
| 1097 | 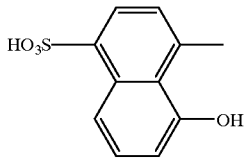 | 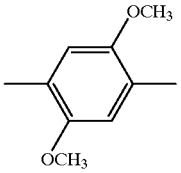 | 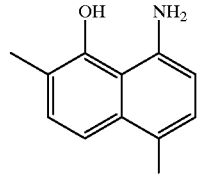 |
TABLE 12
| Compound No. | B | A | C |
|---|---|---|---|
| 1098 | 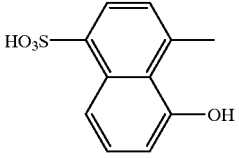 | 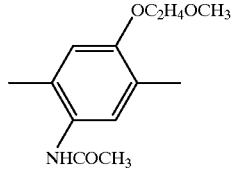 | 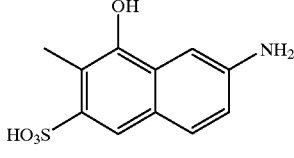 |
| 1099 | 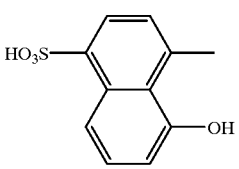 | 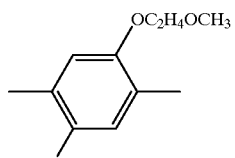 | 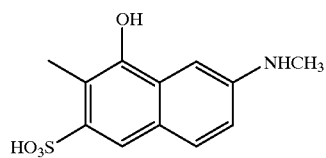 |
| 1100 | 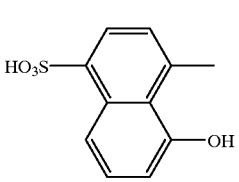 | 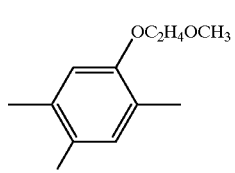 | 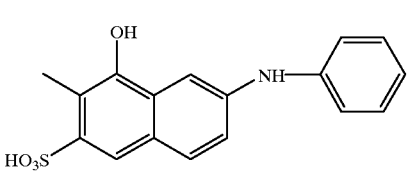 |
| 1101 | 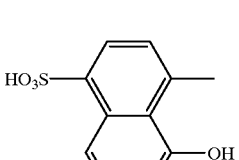 | 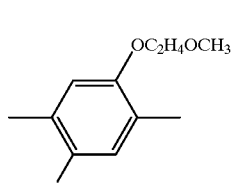 | 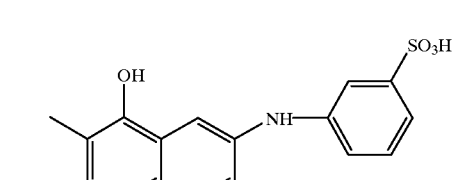 |

TABLE 12-continued
| Compound No. | B | A | C |
|---|---|---|---|
| 1102 | 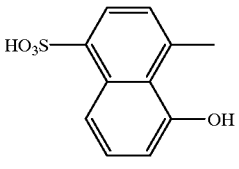 |  | 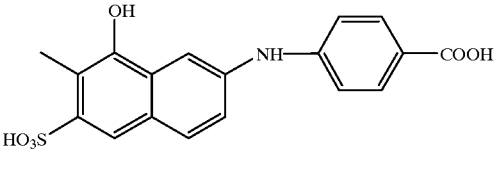 |
| 1103 | 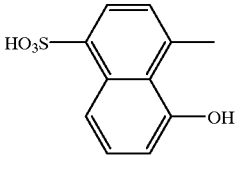 | 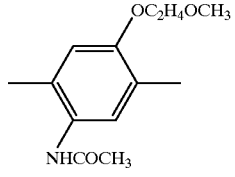 | 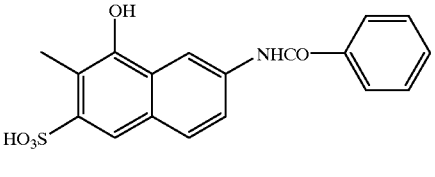 |
| 1104 | 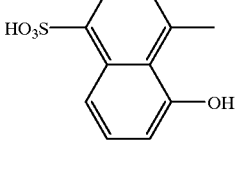 |  | 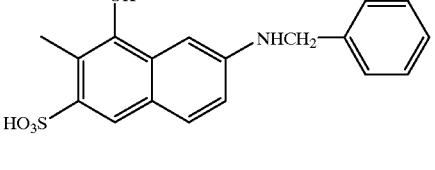 |
| 1105 | 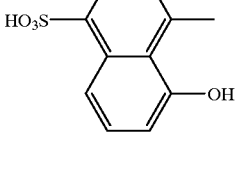 | 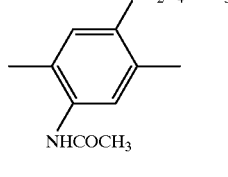 | 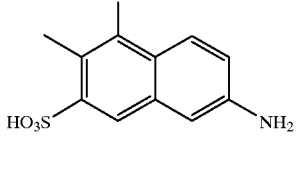 |
| 1106 | 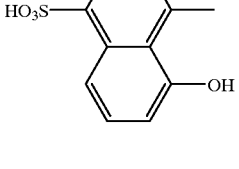 |  | 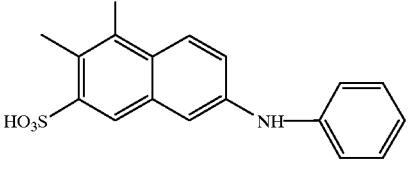 |
| 1107 | 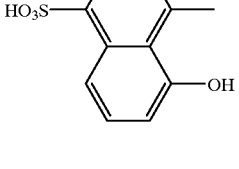 |  | 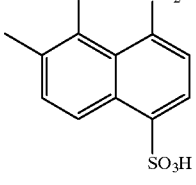 |
TABLE 13
| Compound No. | B | A | C |
|---|---|---|---|
| 1108 | 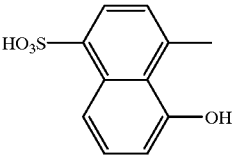 |  | 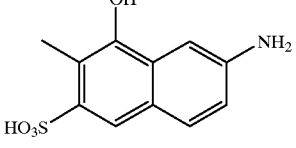 |

TABLE 13-continued
| Compound No. | B | A | C |
|---|---|---|---|
| 1109 | 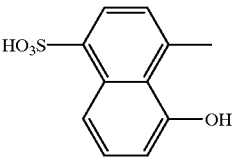 | 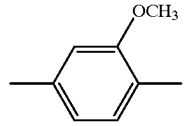 | 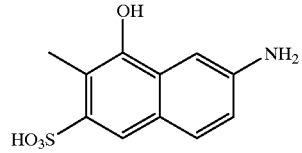 |
| 1110 | 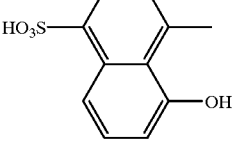 | 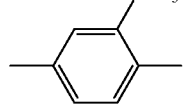 | 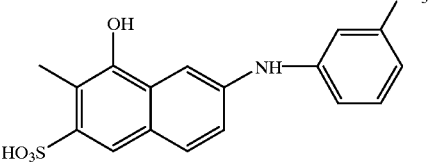 |
| 1111 | 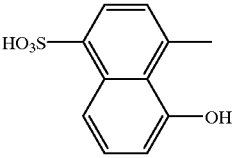 | 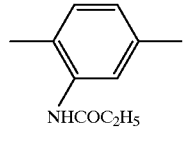 | 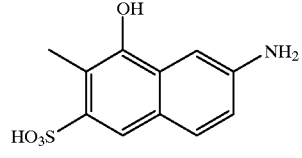 |
| 1112 | 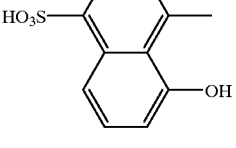 | 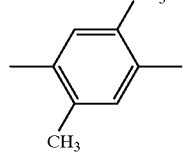 | 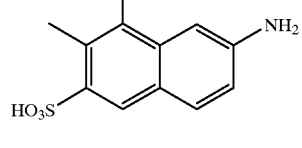 |
| 1113 | 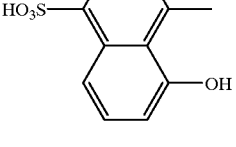 | 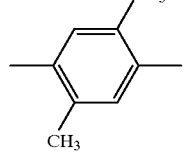 | 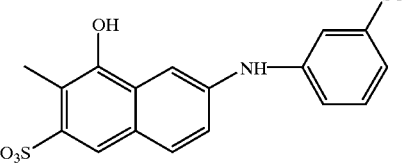 |
| 1114 | 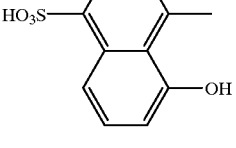 | 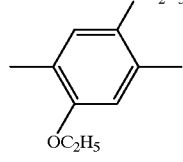 | 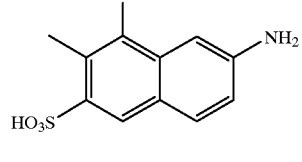 |
| 1115 | 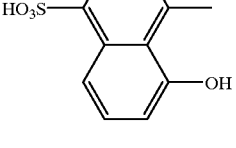 | 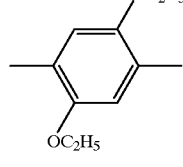 | 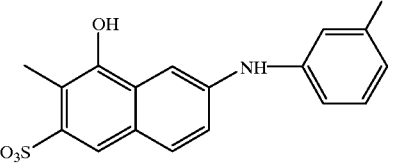 |
| 1116 | 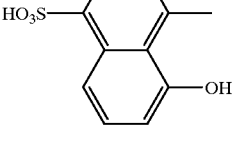 | 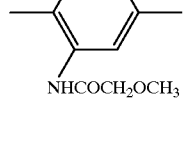 | 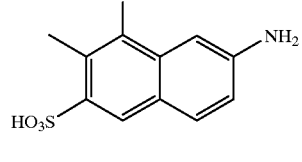 |

TABLE 13-continued

| Compound No. | B | A | C |
|---|---|---|---|
| 1117 | naphthalene with HO₃S, CH₃, OH substituents | benzene with NHCONH₂ and two methyl groups | naphthalene with OH, CH₃, HO₃S, NH₂ substituents |

TABLE 14

| Compound No. | B | A | C |
|---|---|---|---|
| 1118 | naphthalene with HO₃S (×2), CH₃, OH substituents | benzene with CH₃ and two methyl groups | naphthalene with OH, CH₃, HO₃S, NH₂ substituents |
| 1119 | naphthalene with HO₃S (×2), CH₃, OH substituents | benzene with CH₃ and two methyl groups | naphthalene with OH, CH₃, HO₃S, NHCH₃ substituents |
| 1120 | naphthalene with HO₃S (×2), CH₃, OH substituents | benzene with CH₃ and two methyl groups | naphthalene with OH, CH₃, HO₃S, NH-phenyl substituents |
| 1121 | naphthalene with HO₃S (×2), CH₃, OH substituents | benzene with CH₃ and two methyl groups | naphthalene with OH, CH₃, HO₃S, NH-(3-sulfophenyl) substituents |

TABLE 14-continued

| Compound No. | B | A | C |
|---|---|---|---|
| 1122 | naphthalene with HO₃S, CH₃, OH, HO₃S substituents | 1,3-dimethylbenzene (CH₃ shown) | naphthalene with OH, CH₃, HO₃S, NH-C₆H₄-COOH substituents |
| 1123 | naphthalene with HO₃S, CH₃, OH, HO₃S substituents | 1,3-dimethylbenzene (CH₃ shown) | naphthalene with OH, CH₃, HO₃S, NHCO-C₆H₅ substituents |
| 1124 | naphthalene with HO₃S, CH₃, OH, HO₃S substituents | 1,3-dimethylbenzene (CH₃ shown) | naphthalene with OH, CH₃, HO₃S, NHCH₂-C₆H₅ substituents |
| 1125 | naphthalene with HO₃S, CH₃, OH, HO₃S substituents | 1,3-dimethylbenzene (CH₃ shown) | naphthalene with OH, CH₃, HO₃S, NH₂ substituents |
| 1126 | naphthalene with HO₃S, CH₃, OH, HO₃S substituents | 1,3-dimethylbenzene (CH₃ shown) | naphthalene with OH, CH₃, HO₃S, NH-C₆H₅ substituents |

TABLE 15

| Compound No. | B | A | C |
|---|---|---|---|
| 1127 | naphthalene with HO₃S, CH₃, OH, HO₃S substituents | benzene with two CH₃ groups | naphthalene with OH, NH₂, CH₃, SO₃H substituents |
| 1128 | naphthalene with HO₃S, CH₃, OH, HO₃S substituents | benzene with OCH₃, CH₃, CH₃ substituents | naphthalene with OH, CH₃, HO₃S, NH₂ substituents |
| 1129 | naphthalene with HO₃S, CH₃, OH, HO₃S substituents | benzene with OCH₃, CH₃, CH₃ substituents | naphthalene with OH, CH₃, HO₃S, NHCH₃ substituents |
| 1130 | naphthalene with HO₃S, CH₃, OH, HO₃S substituents | benzene with OCH₃, CH₃, CH₃ substituents | naphthalene with OH, CH₃, HO₃S, N(CH₃)₂ substituents |
| 1131 | naphthalene with HO₃S, CH₃, OH, HO₃S substituents | benzene with OCH₃, CH₃, CH₃ substituents | naphthalene with OH, CH₃, HO₃S, NH-phenyl substituents |
| 1132 | naphthalene with HO₃S, CH₃, OH, HO₃S substituents | benzene with OCH₃, CH₃, CH₃ substituents | naphthalene with OH, CH₃, HO₃S, NH-(3-sulfophenyl) substituents |

TABLE 15-continued
| Compound No. | B | A | C |
|---|---|---|---|
| 1133 | 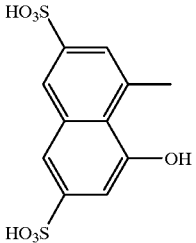 | 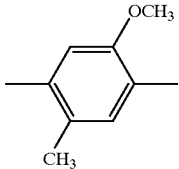 | 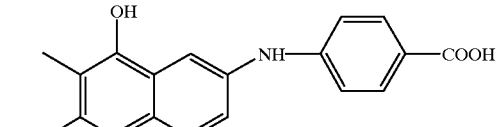 |
| 1134 | 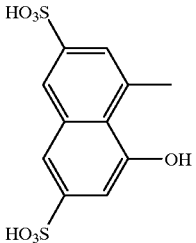 | 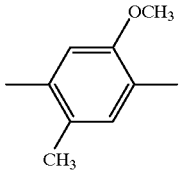 | 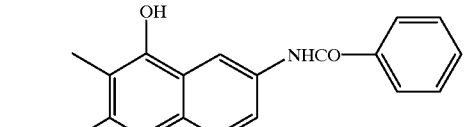 |
| 1135 | 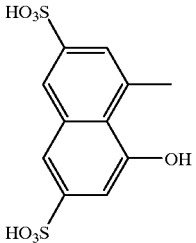 | 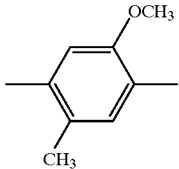 | 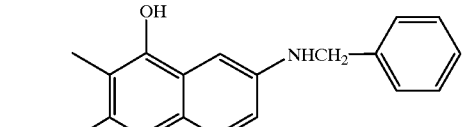 |
TABLE 16
| Compound No. | B | A | C |
|---|---|---|---|
| 1136 | 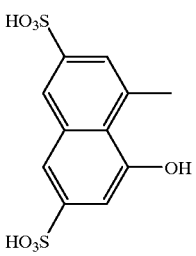 | 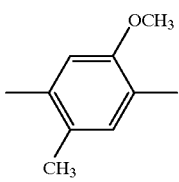 | 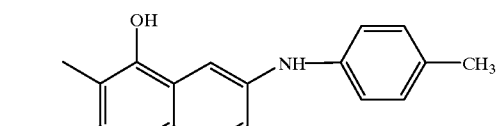 |
| 1137 | 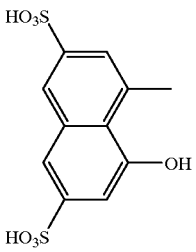 | 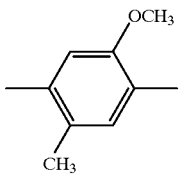 | 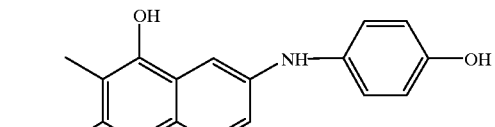 |

TABLE 16-continued

| Compound No. | B | A | C |
|---|---|---|---|
| 1138 | naphthalene with HO₃S (two), CH₃, OH substituents | benzene with OCH₃, CH₃ substituents | naphthalene-OH, CH₃, HO₃S, NH-phenyl(SO₃H, NH₂) |
| 1139 | naphthalene with HO₃S (two), CH₃, OH substituents | benzene with OCH₃, CH₃ substituents | naphthalene-OH, CH₃, HO₃S, NH-phenyl(COOH, OH) |
| 1140 | naphthalene with HO₃S (two), CH₃, OH substituents | benzene with OCH₃, CH₃ substituents | naphthalene-OH, CH₃, HO₃S, NHCO-phenyl-OCH₃ |
| 1141 | naphthalene with HO₃S (two), CH₃, OH substituents | benzene with OCH₃, CH₃ substituents | naphthalene-OH, CH₃, HO₃S, NHCH₂-phenyl-Cl |
| 1142 | naphthalene with HO₃S (two), CH₃, OH substituents | benzene with OCH₃, CH₃ substituents | naphthalene-OH, CH₃, HO₃S, NH₂ |
| 1143 | naphthalene with HO₃S (two), CH₃, OH substituents | benzene with OCH₃, CH₃ substituents | naphthalene-OH, CH₃, HO₃S, NHCH₃ |

TABLE 16-continued

| Compound No. | B | A | C |
|---|---|---|---|
| 1144 | naphthalene with 2 HO₃S groups, CH₃, OH | benzene with OCH₃, 2 CH₃ | naphthalene with OH, CH₃, HO₃S, N(CH₃)₂ |

TABLE 17

| Compound No. | B | A | C |
|---|---|---|---|
| 1145 | naphthalene with 2 HO₃S groups, CH₃, OH | benzene with OCH₃, 2 CH₃ | naphthalene with OH, CH₃, HO₃S, NH-phenyl |
| 1146 | naphthalene with 2 HO₃S groups, CH₃, OH | benzene with OCH₃, 2 CH₃ | naphthalene with OH, CH₃, HO₃S, NH-C₆H₄-CH₃ |
| 1147 | naphthalene with 2 HO₃S groups, CH₃, OH | benzene with OCH₃, 2 CH₃ | naphthalene with OH, CH₃, HO₃S, NHCO-phenyl |
| 1148 | naphthalene with 2 HO₃S groups, CH₃, OH | benzene with OCH₃, 2 CH₃ | naphthalene with OH, CH₃, HO₃S, NHCH₂-phenyl |

TABLE 17-continued

| Compound No. | B | A | C |
|---|---|---|---|
| 1149 | naphthalene with HO₃S (top), CH₃, OH, HO₃S (bottom) substituents | benzene with OCH₃, CH₃, CH₃ substituents | naphthalene with OH, NH₂, CH₃, SO₃H substituents |
| 1150 | naphthalene with HO₃S (top), CH₃, OH, HO₃S (bottom) substituents | benzene with OCH₃, CH₃, CH₃ substituents | naphthalene with OH, CH₃, HO₃S, NH₂ substituents |
| 1151 | naphthalene with HO₃S (top), CH₃, OH, HO₃S (bottom) substituents | benzene with OCH₃, CH₃, CH₃ substituents | naphthalene with OH, NH₂, CH₃, SO₃H substituents |
| 1152 | naphthalene with HO₃S (top), CH₃, OH, HO₃S (bottom) substituents | benzene with OCH₃, CH₃, CH₃, NHCOCH₃ substituents | naphthalene with OH, CH₃, HO₃S, NH₂ substituents |
| 1153 | naphthalene with HO₃S (top), CH₃, OH, HO₃S (bottom) substituents | benzene with OCH₃, CH₃, CH₃, NHCOCH₃ substituents | naphthalene with OH, CH₃, HO₃S, NHCH₃ substituents |

TABLE 18

| Compound No. | B | A | C |
|---|---|---|---|
| 1154 | | | |
| 1155 | | | |
| 1156 | | | |
| 1157 | | | |
| 1158 | | | |
| 1159 | | | |

TABLE 18-continued
| Compound No. | B | A | C |
|---|---|---|---|
| 1160 | 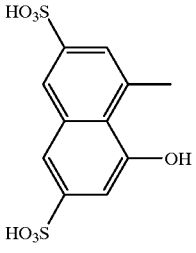 | 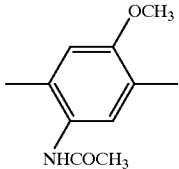 | 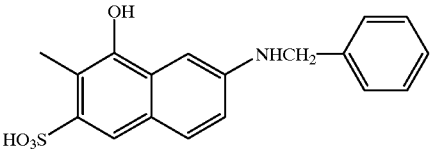 |
| 1161 | 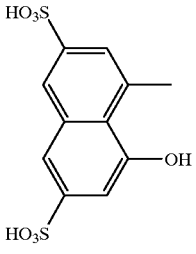 | 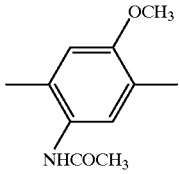 | 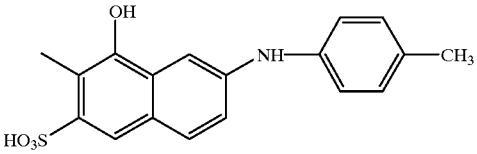 |
| 1162 | 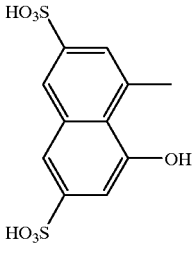 | 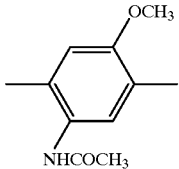 | 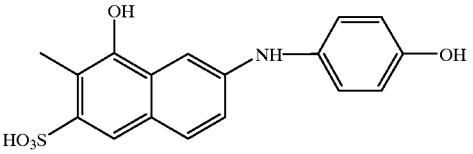 |
TABLE 19
| Compound No. | B | A | C |
|---|---|---|---|
| 1163 | 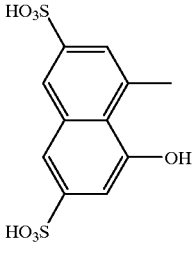 | 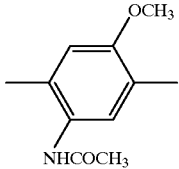 | 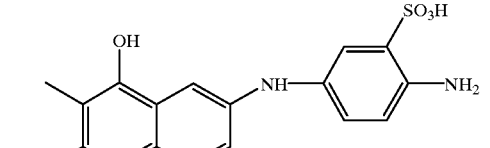 |
| 1164 | 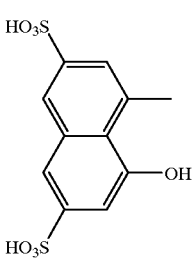 | 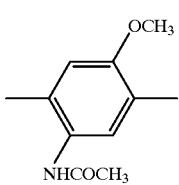 | 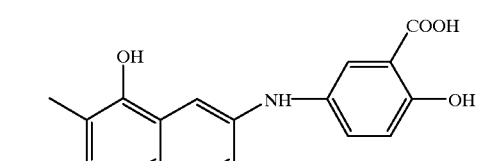 |

TABLE 19-continued

| Compound No. | B | A | C |
|---|---|---|---|
| 1165 | naphthalene with HO₃S (×2), CH₃, OH substituents | benzene with OCH₃, (CH₃)₂, NHCOCH₃ | 4-hydroxy-3-methyl-6-sulfo-naphthalene-7-NHCO-(4-methoxyphenyl) |
| 1166 | naphthalene with HO₃S (×2), CH₃, OH substituents | benzene with OCH₃, (CH₃)₂, NHCOCH₃ | 4-hydroxy-3-methyl-6-sulfo-naphthalene-7-NHCH₂-(4-chlorophenyl) |
| 1167 | naphthalene with HO₃S (×2), CH₃, OH substituents | benzene with OCH₃, (CH₃)₂, NHCOCH₃ | 4-hydroxy-3-methyl-6-sulfo-naphthalene-7-NH₂ |
| 1168 | naphthalene with HO₃S (×2), CH₃, OH substituents | benzene with OCH₃, (CH₃)₂, NHCOCH₃ | 4-hydroxy-3-methyl-6-sulfo-naphthalene-7-NHCH₃ |
| 1169 | naphthalene with HO₃S (×2), CH₃, OH substituents | benzene with OCH₃, (CH₃)₂, NHCOCH₃ | 4-hydroxy-3-methyl-6-sulfo-naphthalene-7-N(CH₃)₂ |
| 1170 | naphthalene with HO₃S (×2), CH₃, OH substituents | benzene with OCH₃, (CH₃)₂, NHCOCH₃ | 4-hydroxy-3-methyl-6-sulfo-naphthalene-7-NHCOCH₃ |

TABLE 19-continued

| Compound No. | B | A | C |
|---|---|---|---|
| 1171 | 8-methyl-naphthalene-2,6-disulfonic acid with OH | 4-methoxy-2,6-dimethyl-N-acetylaniline | 1-hydroxy-2-methyl-6-(phenylamino)naphthalene-3-sulfonic acid |

TABLE 20

| Compound No. | B | A | C |
|---|---|---|---|
| 1172 | 8-methyl-naphthalene-2,6-disulfonic acid with OH | 4-methoxy-2,6-dimethyl-N-acetylaniline | 1-hydroxy-2-methyl-6-(4-methylphenylamino)naphthalene-3-sulfonic acid |
| 1173 | 8-methyl-naphthalene-2,6-disulfonic acid with OH | 4-methoxy-2,6-dimethyl-N-acetylaniline | 1-hydroxy-2-methyl-6-(benzoylamino)naphthalene-3-sulfonic acid |
| 1174 | 8-methyl-naphthalene-2,6-disulfonic acid with OH | 4-methoxy-2,6-dimethyl-N-acetylaniline | 1-hydroxy-2-methyl-6-(benzylamino)naphthalene-3-sulfonic acid |
| 1175 | 8-methyl-naphthalene-2,6-disulfonic acid with OH | 4-methoxy-2,6-dimethyl-N-acetylaniline | 4-amino-5-hydroxy-6-methylnaphthalene-1-sulfonic acid |

TABLE 20-continued

| Compound No. | B | A | C |
|---|---|---|---|
| 1176 | | | |
| 1177 | | | |
| 1178 | | | |
| 1179 | | | |
| 1180 | | | |

TABLE 21

| Compound No. | B | A | C |
|---|---|---|---|
| 1181 | | | |
| 1182 | | | |
| 1183 | | | |
| 1184 | | | |
| 1185 | | | |
| 1186 | | | |

TABLE 21-continued

| Compound No. | B | A | C |
|---|---|---|---|
| 1187 | (structure) | (structure) | (structure) |
| 1188 | (structure) | (structure) | (structure) |
| 1189 | (structure) | (structure) | (structure) |

TABLE 22

| Compound No. | B | A | C |
|---|---|---|---|
| 1190 | (structure) | (structure) | (structure) |
| 1191 | (structure) | (structure) | (structure) |

TABLE 22-continued

| Compound No. | B | A | C |
|---|---|---|---|
| 1192 | naphthalene with HO₃S (×2), CH₃, OH | benzene with OCH₃ (×2), CH₃ (×2) | naphthalene with OH, CH₃, HO₃S, NHCH₂-C₆H₄-Cl |
| 1193 | naphthalene with HO₃S (×2), CH₃, OH | benzene with OCH₃ (×2), CH₃ (×2) | naphthalene with OH, CH₃, HO₃S, NH₂ |
| 1194 | naphthalene with HO₃S (×2), CH₃, OH | benzene with OCH₃ (×2), CH₃ (×2) | naphthalene with OH, CH₃, HO₃S, NHCH₃ |
| 1195 | naphthalene with HO₃S (×2), CH₃, OH | benzene with OCH₃ (×2), CH₃ (×2) | naphthalene with OH, CH₃, HO₃S, N(CH₃)₂ |
| 1196 | naphthalene with HO₃S (×2), CH₃, OH | benzene with OCH₃ (×2), CH₃ (×2) | naphthalene with OH, CH₃, HO₃S, NHCOCH₃ |
| 1197 | naphthalene with HO₃S (×2), CH₃, OH | benzene with OCH₃ (×2), CH₃ (×2) | naphthalene with OH, CH₃, HO₃S, NH-C₆H₅ |

TABLE 22-continued
| Compound No. | B | A | C |
|---|---|---|---|
| 1198 | 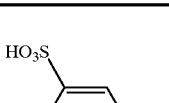 | | |
TABLE 23
| Compound No. | B | A | C |
|---|---|---|---|
| 1199 |  | | |
| 1200 | | | |
| 1201 | | | |
| 1202 | 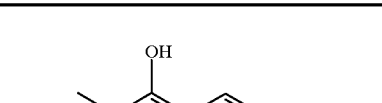 | | |

TABLE 23-continued

| Compound No. | B | A | C |
|---|---|---|---|
| 1203 | naphthalene with HO₃S (2 positions), CH₃, OH | benzene with OCH₃, OCH₃, 2 CH₃ | naphthalene with OH, NH₂, CH₃, SO₃H |
| 1204 | naphthalene with HO₃S (2 positions), CH₃, OH | benzene with OC₂H₄OCH₃, NHCOCH₃, 2 CH₃ | naphthalene with OH, NH₂, CH₃, HO₃S |
| 1205 | naphthalene with HO₃S (2 positions), CH₃, OH | benzene with OC₂H₄OCH₃, NHCOCH₃, 2 CH₃ | naphthalene with OH, NHCH₃, CH₃, HO₃S |
| 1206 | naphthalene with HO₃S (2 positions), CH₃, OH | benzene with OC₂H₄OCH₃, NHCOCH₃, 2 CH₃ | naphthalene with OH, NHCOCH₃, CH₃, HO₃S |
| 1207 | naphthalene with HO₃S (2 positions), CH₃, OH | benzene with OC₂H₄OCH₃, NHCOCH₃, 2 CH₃ | naphthalene with OH, N(CH₃)₂, CH₃, HO₃S |

TABLE 24
| Compound No. | B | A | C |
|---|---|---|---|
| 1208 | 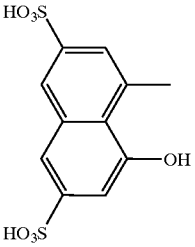 | 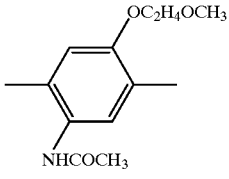 | 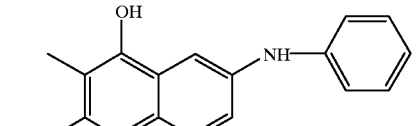 |
| 1209 | 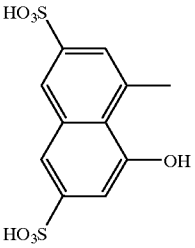 | 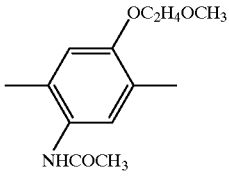 | 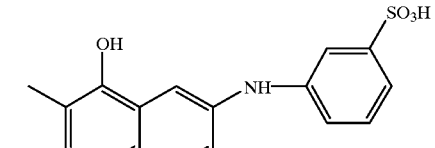 |
| 1210 | 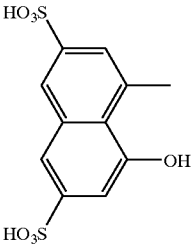 | 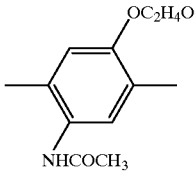 | 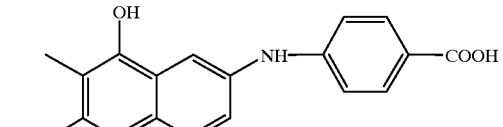 |
| 1211 | 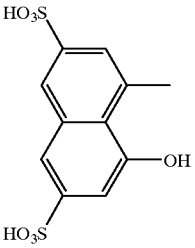 | 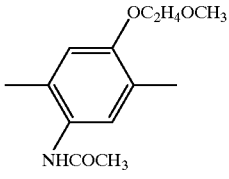 | 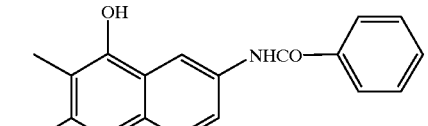 |
| 1212 | 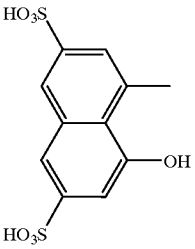 | 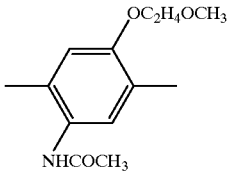 | 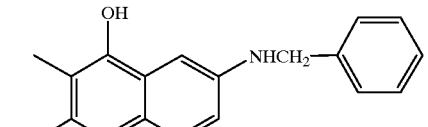 |

TABLE 24-continued

| Compound No. | B | A | C |
|---|---|---|---|
| 1213 | 8-methyl-naphthalene-2,6-disulfonic acid, 1-OH | 2,5-dimethyl-4-OC₂H₄OCH₃-NHCOCH₃-benzene | 1-OH, 2-methyl-3-SO₃H-naphthalene-6-NH-(4-methylphenyl) |
| 1214 | 8-methyl-naphthalene-2,6-disulfonic acid, 1-OH | 2,5-dimethyl-4-OC₂H₄OCH₃-NHCOCH₃-benzene | 1-OH, 2-methyl-3-SO₃H-naphthalene-6-NH-(4-hydroxyphenyl) |
| 1215 | 8-methyl-naphthalene-2,6-disulfonic acid, 1-OH | 2,5-dimethyl-4-OC₂H₄OCH₃-NHCOCH₃-benzene | 1-OH, 2-methyl-3-SO₃H-naphthalene-6-NH-(3-SO₃H-4-NH₂-phenyl) |
| 1216 | 8-methyl-naphthalene-2,6-disulfonic acid, 1-OH | 2,5-dimethyl-4-OC₂H₄OCH₃-NHCOCH₃-benzene | 1-OH, 2-methyl-3-SO₃H-naphthalene-6-NH-(3-COOH-4-OH-phenyl) |

TABLE 25

| Compound No. | B | A | C |
|---|---|---|---|
| 1217 | 8-methyl-naphthalene-2,6-disulfonic acid, 1-OH | 2,5-dimethyl-4-OC₂H₄OCH₃-NHCOCH₃-benzene | 1-OH, 2-methyl-3-SO₃H-naphthalene-6-NHCO-(4-OCH₃-phenyl) |

TABLE 25-continued

| Compound No. | B | A | C |
|---|---|---|---|
| 1218 | 8-methyl-4-hydroxynaphthalene-2,6-disulfonic acid | 4-(2-methoxyethoxy)-2,5-dimethyl-acetanilide | 1-hydroxy-2-methyl-7-[(4-chlorobenzyl)amino]naphthalene-3-sulfonic acid |
| 1219 | 8-methyl-4-hydroxynaphthalene-2,6-disulfonic acid | 4-(2-methoxyethoxy)-2,5-dimethyl-acetanilide | 1-hydroxy-2-methyl-7-aminonaphthalene-3-sulfonic acid |
| 1220 | 8-methyl-4-hydroxynaphthalene-2,6-disulfonic acid | 4-(2-methoxyethoxy)-2,5-dimethyl-acetanilide | 1-hydroxy-2-methyl-7-(methylamino)naphthalene-3-sulfonic acid |
| 1221 | 8-methyl-4-hydroxynaphthalene-2,6-disulfonic acid | 4-(2-methoxyethoxy)-2,5-dimethyl-acetanilide | 1-hydroxy-2-methyl-7-(dimethylamino)naphthalene-3-sulfonic acid |
| 1222 | 8-methyl-4-hydroxynaphthalene-2,6-disulfonic acid | 4-(2-methoxyethoxy)-2,5-dimethyl-acetanilide | 1-hydroxy-2-methyl-7-(acetylamino)naphthalene-3-sulfonic acid |

TABLE 25-continued
| Compound No. | B | A | C |
|---|---|---|---|
| 1223 | 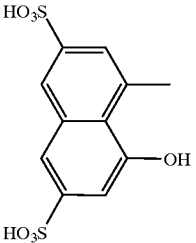 |  | 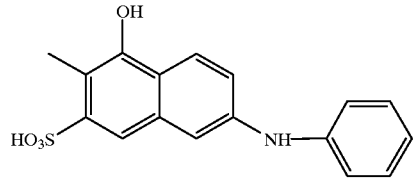 |
| 1224 | 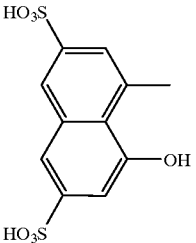 |  | 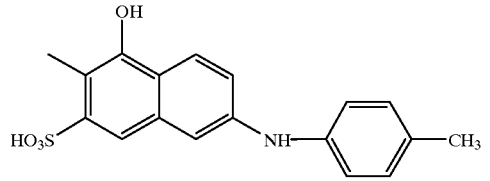 |
| 1225 | 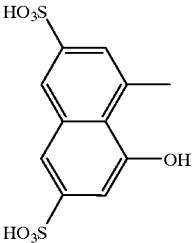 |  | 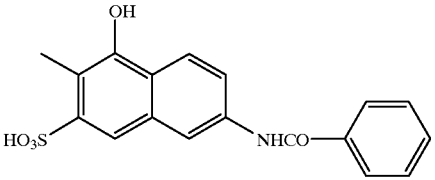 |
TABLE 26
| Compound No. | B | A | C |
|---|---|---|---|
| 1226 | 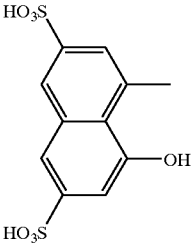 |  | 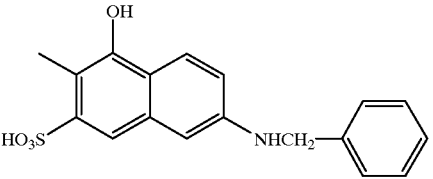 |
| 1227 | 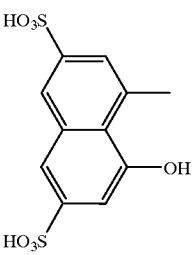 | 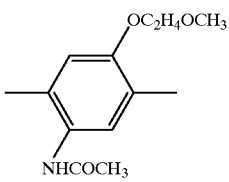 | 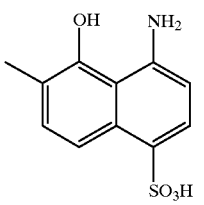 |

TABLE 26-continued

| Compound No. | B | A | C |
|---|---|---|---|
| 1228 | | | |
| 1229 | | | |
| 1230 | | | |
| 1231 | | | |
| 1232 | | | |

TABLE 26-continued

| Compound No. | B | A | C |
|---|---|---|---|
| 1233 | 8-methyl-1-hydroxynaphthalene-3,6-disulfonic acid | 1,4-phenylene | 1-hydroxy-2-methyl-6-[(3-sulfophenyl)amino]naphthalene-3-sulfonic acid |
| 1234 | 8-methyl-1-hydroxynaphthalene-3,6-disulfonic acid | 1,4-phenylene | 1-hydroxy-2-methyl-6-[(4-carboxyphenyl)amino]naphthalene-3-sulfonic acid |

TABLE 27

| Compound No. | B | A | C |
|---|---|---|---|
| 1235 | 8-methyl-1-hydroxynaphthalene-3,6-disulfonic acid | 1,4-phenylene | 1-hydroxy-2-methyl-6-(phenylcarbonylamino)naphthalene-3-sulfonic acid |
| 1236 | 8-methyl-1-hydroxynaphthalene-3,6-disulfonic acid | 1,4-phenylene | 1-hydroxy-2-methyl-6-(benzylamino)naphthalene-3-sulfonic acid |
| 1237 | 8-methyl-1-hydroxynaphthalene-3,6-disulfonic acid | 1,4-phenylene | 6-amino-1-hydroxy-2-methylnaphthalene-3-sulfonic acid |

TABLE 27-continued
| Compound No. | B | A | C |
|---|---|---|---|
| 1238 | 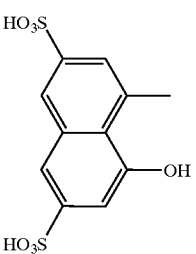 | 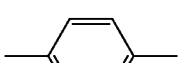 | 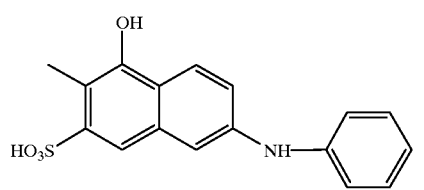 |
| 1239 | 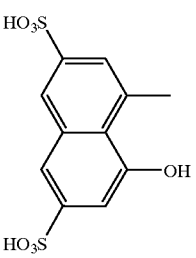 | 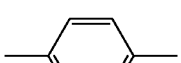 | 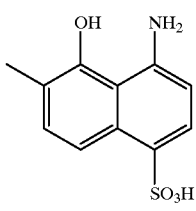 |
| 1240 | 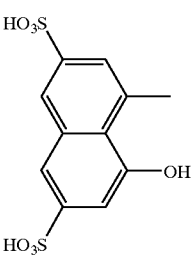 | 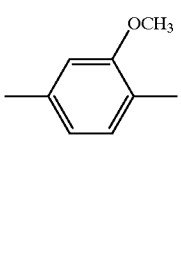 | 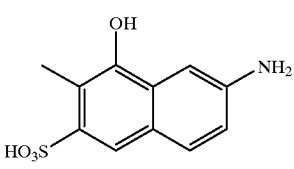 |
| 1241 | 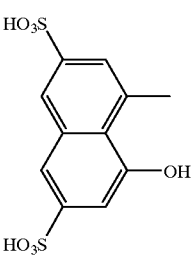 | 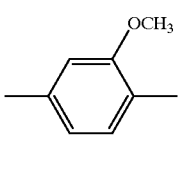 | 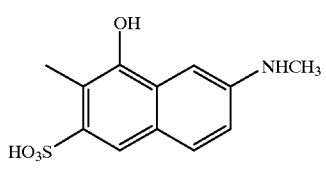 |
| 1242 | 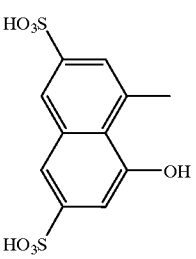 | 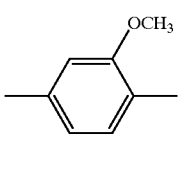 | 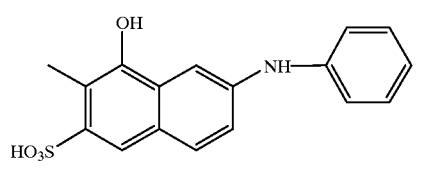 |

TABLE 27-continued

| Compound No. | B | A | C |
|---|---|---|---|
| 1243 | (naphthalene with HO₃S, CH₃, OH, HO₃S substituents) | (benzene with OCH₃ and two CH₃ substituents) | (naphthalene with OH, CH₃, HO₃S, NH-phenyl-SO₃H substituents) |

TABLE 28

| Compound No. | B | A | C |
|---|---|---|---|
| 1244 | (naphthalene with HO₃S, CH₃, OH, HO₃S substituents) | (benzene with OCH₃ and two CH₃ substituents) | (naphthalene with OH, CH₃, HO₃S, NH-phenyl-COOH substituents) |
| 1245 | (naphthalene with HO₃S, CH₃, OH, HO₃S substituents) | (benzene with OCH₃ and two CH₃ substituents) | (naphthalene with OH, CH₃, HO₃S, NHCO-phenyl substituents) |
| 1246 | (naphthalene with HO₃S, CH₃, OH, HO₃S substituents) | (benzene with OCH₃ and two CH₃ substituents) | (naphthalene with OH, CH₃, HO₃S, NHCH₂-phenyl substituents) |
| 1247 | (naphthalene with HO₃S, CH₃, OH, HO₃S substituents) | (benzene with OCH₃ and two CH₃ substituents) | (naphthalene with OH, CH₃, HO₃S, NH₂ substituents) |

TABLE 28-continued

| Compound No. | B | A | C |
|---|---|---|---|
| 1248 | | | |
| 1249 | | | |
| 1250 | | | |
| 1251 | | | |
| 1252 | | | |

TABLE 29

| Compound No. | B | A | C |
|---|---|---|---|
| 1253 | | | |
| 1254 | | | |
| 1255 | | | |
| 1256 | | | |
| 1257 | | | |

TABLE 29-continued

| Compound No. | B | A | C |
|---|---|---|---|
| 1258 | 8-methyl-1-hydroxy-3,6-disulfonaphthalene | 2,5-dimethyl-NHCOC₂H₅-benzene | 1-hydroxy-2-methyl-6-anilino-3-sulfonaphthalene |
| 1259 | 8-methyl-1-hydroxy-3,6-disulfonaphthalene | 2,5-dimethyl-NHCOC₂H₅-benzene | 5-hydroxy-6-methyl-4-amino-1-sulfonaphthalene |
| 1260 | 8-methyl-1-hydroxy-3,6-disulfonaphthalene | 2,5-dimethyl-CH₃ benzene | 1-hydroxy-2-methyl-6-amino-3-sulfonaphthalene |
| 1261 | 8-methyl-1-hydroxy-3,6-disulfonaphthalene | 2,5-dimethyl-CH₃ benzene | 1-hydroxy-2-methyl-6-(N-methylamino)-3-sulfonaphthalene |

TABLE 30

| Compound No. | B | A | C |
|---|---|---|---|
| 1262 | 8-methyl-1-hydroxy-3,6-disulfonaphthalene | 2,5-dimethyl-CH₃ benzene | 1-hydroxy-2-methyl-6-anilino-3-sulfonaphthalene |

TABLE 30-continued

| Compound No. | B | A | C |
|---|---|---|---|
| 1263 | 8-methyl-1-hydroxy-3,6-disulfonaphthalene | 1,2,4,5-tetramethylbenzene | 4-hydroxy-3-methyl-6-[(3-sulfophenyl)amino]-naphthalene-2-sulfonic acid |
| 1264 | 8-methyl-1-hydroxy-3,6-disulfonaphthalene | 1,2,4,5-tetramethylbenzene | 4-[(5-hydroxy-6-methyl-7-sulfo-2-naphthyl)amino]benzoic acid |
| 1265 | 8-methyl-1-hydroxy-3,6-disulfonaphthalene | 1,2,4,5-tetramethylbenzene | 6-benzamido-4-hydroxy-3-methylnaphthalene-2-sulfonic acid |
| 1266 | 8-methyl-1-hydroxy-3,6-disulfonaphthalene | 1,2,4,5-tetramethylbenzene | 6-(benzylamino)-4-hydroxy-3-methylnaphthalene-2-sulfonic acid |
| 1267 | 8-methyl-1-hydroxy-3,6-disulfonaphthalene | 1,2,4,5-tetramethylbenzene | 6-amino-4-hydroxy-3-methylnaphthalene-2-sulfonic acid |

TABLE 30-continued

| Compound No. | B | A | C |
|---|---|---|---|
| 1268 | 6-methyl-4,8-disulfonaphthalen-1-ol with HO₃S groups at 3,6 and CH₃, OH at 5,8 | 2,4,5-trimethylphenyl (CH₃ at 2,4,5) | 1-hydroxy-2-methyl-6-(phenylamino)naphthalene-3-sulfonic acid |
| 1269 | same as 1268 B | same as 1268 A | 4-amino-5-hydroxy-6-methylnaphthalene-1-sulfonic acid |
| 1270 | same as 1268 B | 2,5-diethoxy-4-methylphenyl (OC₂H₅ at 2,5) | 6-amino-1-hydroxy-2-methylnaphthalene-3-sulfonic acid |

TABLE 31

| Compound No. | B | A | C |
|---|---|---|---|
| 1271 | same as 1268 B | 2,5-diethoxy-4-methylphenyl | 1-hydroxy-2-methyl-6-(methylamino)naphthalene-3-sulfonic acid |
| 1272 | same as 1268 B | 2,5-diethoxy-4-methylphenyl | 1-hydroxy-2-methyl-6-(phenylamino)naphthalene-3-sulfonic acid |

TABLE 31-continued

| Compound No. | B | A | C |
|---|---|---|---|
| 1273 | naphthalene with HO₃S, CH₃, OH, HO₃S | benzene with OC₂H₅, CH₃, CH₃, OC₂H₅ | naphthalene with OH, CH₃, HO₃S, NH-phenyl-SO₃H |
| 1274 | naphthalene with HO₃S, CH₃, OH, HO₃S | benzene with OC₂H₅, CH₃, CH₃, OC₂H₅ | naphthalene with OH, CH₃, HO₃S, NH-phenyl-COOH |
| 1275 | naphthalene with HO₃S, CH₃, OH, HO₃S | benzene with OC₂H₅, CH₃, CH₃, OC₂H₅ | naphthalene with OH, CH₃, HO₃S, NHCO-phenyl |
| 1276 | naphthalene with HO₃S, CH₃, OH, HO₃S | benzene with OC₂H₅, CH₃, CH₃, OC₂H₅ | naphthalene with OH, CH₃, HO₃S, NHCH₂-phenyl |
| 1277 | naphthalene with HO₃S, CH₃, OH, HO₃S | benzene with OC₂H₅, CH₃, CH₃, OC₂H₅ | naphthalene with OH, CH₃, HO₃S, NH₂ |

TABLE 31-continued
| Compound No. | B | A | C |
|---|---|---|---|
| 1278 | 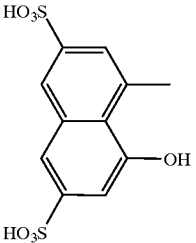 | 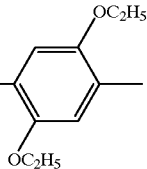 | 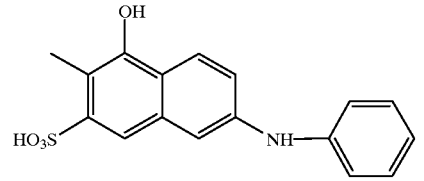 |
| 1279 | 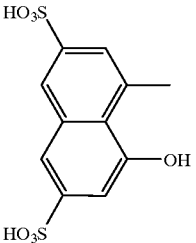 | 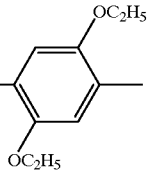 | 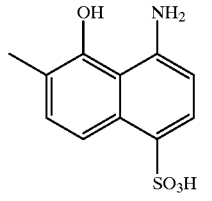 |
TABLE 32
| Compound No. | B | A | C |
|---|---|---|---|
| 1280 | 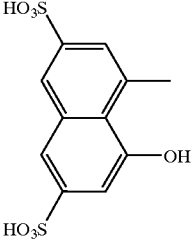 |  | 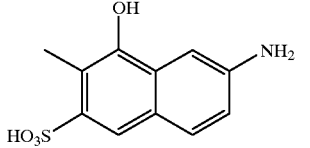 |
| 1281 | 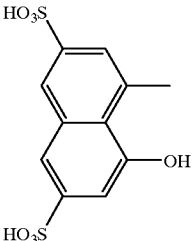 |  | 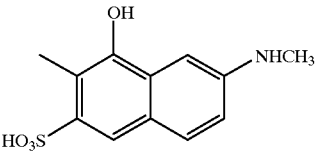 |
| 1282 | 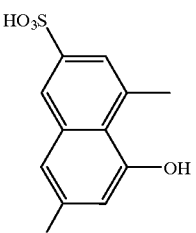 | 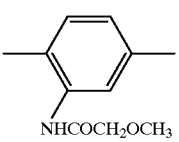 | 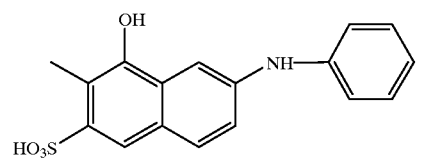 |

TABLE 32-continued

| Compound No. | B | A | C |
|---|---|---|---|
| 1283 | | | |
| 1284 | | | |
| 1285 | | | |
| 1286 | | | |
| 1287 | | | |

TABLE 32-continued

| Compound No. | B | A | C |
|---|---|---|---|
| 1288 | 8-methyl-1-hydroxynaphthalene-3,6-disulfonic acid (HO₃S at 3,6; CH₃ at 8; OH at 1) | 2,5-dimethylphenyl-NHCOCH₂OCH₃ | 3-methyl-4-hydroxy-6-(phenylamino)naphthalene-2-sulfonic acid |

TABLE 33

| Compound No. | B | A | C |
|---|---|---|---|
| 1289 | 8-methyl-1-hydroxynaphthalene-3,6-disulfonic acid | 2,5-dimethylphenyl-NHCOCH₂OCH₃ | 6-methyl-5-hydroxy-8-amino-naphthalene-1-sulfonic acid (NH₂, OH, CH₃, SO₃H) |
| 1290 | 8-methyl-1-hydroxynaphthalene-3,6-disulfonic acid | 2,5-dimethylphenyl-NHCONH₂ | 3-methyl-4-hydroxy-6-amino-naphthalene-2-sulfonic acid |
| 1291 | 8-methyl-1-hydroxynaphthalene-3,6-disulfonic acid | 2,5-dimethylphenyl-NHCONH₂ | 3-methyl-4-hydroxy-6-(methylamino)naphthalene-2-sulfonic acid |
| 1292 | 8-methyl-1-hydroxynaphthalene-3,6-disulfonic acid | 2,5-dimethylphenyl-NHCONH₂ | 3-methyl-4-hydroxy-6-(phenylamino)naphthalene-2-sulfonic acid |

TABLE 33-continued
| Compound No. | B | A | C |
|---|---|---|---|
| 1293 | 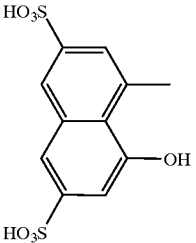 |  | 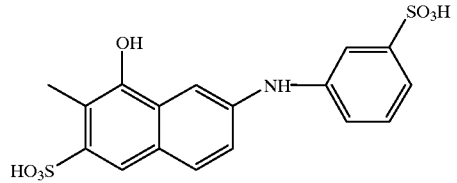 |
| 1294 | 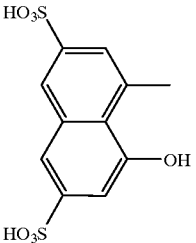 |  | 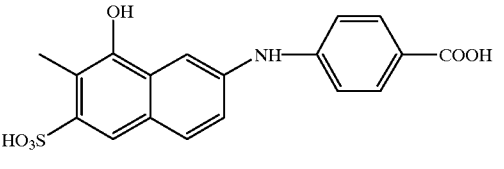 |
| 1295 | 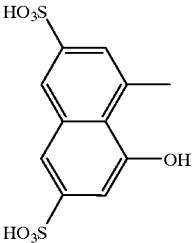 |  | 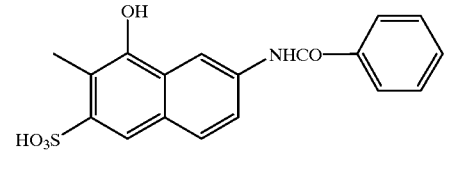 |
| 1296 | 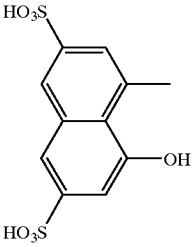 |  | 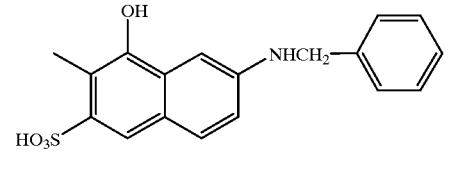 |
| 1297 | 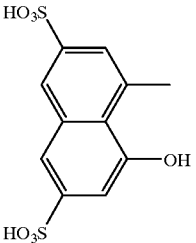 |  | 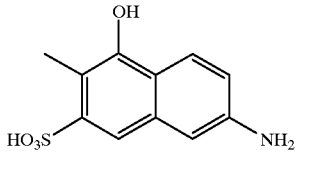 |

TABLE 34
| Compound No. | B | A | C |
|---|---|---|---|
| 1298 | 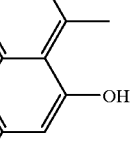 | 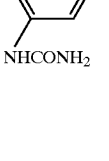 | 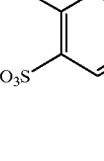 |
| 1299 | 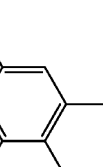 | 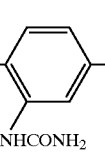 | 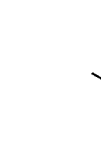 |
| 1300 | 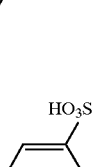 | 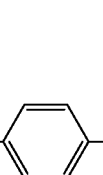 |  |
| 1301 | 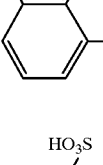 |  | 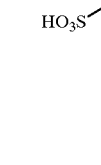 |
| 1302 | 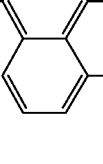 | 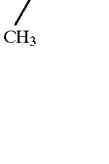 | 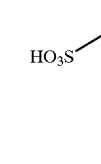 |
| 1303 | 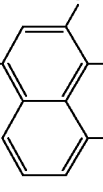 | 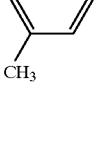 | 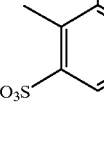 |

TABLE 34-continued

| Compound No. | B | A | C |
|---|---|---|---|
| 1304 | naphthalene with HO3S, HO3S, CH3, OH substituents | 1,2,4-trimethylbenzene (CH3) | naphthalene with OH, CH3, HO3S, NH-C6H4-COOH substituents |
| 1305 | naphthalene with HO3S, HO3S, CH3, OH substituents | 1,2,4-trimethylbenzene (CH3) | naphthalene with OH, CH3, HO3S, NHCO-phenyl substituents |
| 1306 | naphthalene with HO3S, HO3S, CH3, OH substituents | 1,2,4-trimethylbenzene (CH3) | naphthalene with OH, CH3, HO3S, NHCH2-phenyl substituents |

TABLE 35

| Compound No. | B | A | C |
|---|---|---|---|
| 1307 | naphthalene with HO3S, HO3S, CH3, OH substituents | 1,2,4-trimethylbenzene (CH3) | naphthalene with OH, CH3, HO3S, NH2 substituents |
| 1308 | naphthalene with HO3S, HO3S, CH3, OH substituents | 1,2,4-trimethylbenzene (CH3) | naphthalene with OH, CH3, HO3S, NH-phenyl substituents |
| 1309 | naphthalene with HO3S, HO3S, CH3, OH substituents | 1,2,4-trimethylbenzene (CH3) | naphthalene with OH, CH3, NH2, SO3H substituents |

TABLE 35-continued

| Compound No. | B | A | C |
|---|---|---|---|
| 1310 | | | |
| 1311 | | | |
| 1312 | | | |
| 1313 | | | |
| 1314 | | | |
| 1315 | | | |

TABLE 35-continued
| Compound No. | B | A | C |
|---|---|---|---|
| 1316 | 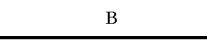 | | |
TABLE 36
| Compound No. | B | A | C |
|---|---|---|---|
| 1317 | | | |
| 1318 | | | |
| 1319 | | | |
| 1320 | | | |
| 1321 | | | |
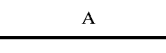
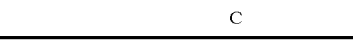

TABLE 36-continued
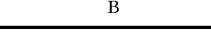
TABLE 37

TABLE 37-continued

TABLE 37-continued

| Compound No. | B | A | C |
|---|---|---|---|
| 1335 | naphthalene with HO3S, HO3S, CH3, OH | benzene with OCH3, CH3, CH3, OCH3 | naphthalene with OH, CH3, HO3S, NHCOPh |
| 1336 | naphthalene with HO3S, HO3S, CH3, OH | benzene with OCH3, CH3, CH3, OCH3 | naphthalene with OH, CH3, HO3S, NHCOPh |

TABLE 38

| Compound No. | B | A | C |
|---|---|---|---|
| 1337 | naphthalene with HO3S, HO3S, CH3, OH | benzene with OCH3, CH3, CH3, OCH3 | naphthalene with OH, CH3, HO3S, NH2 |
| 1338 | naphthalene with HO3S, HO3S, CH3, OH | benzene with OCH3, CH3, CH3, OCH3 | naphthalene with OH, CH3, HO3S, NHPh |
| 1339 | naphthalene with HO3S, HO3S, CH3, OH | benzene with OCH3, CH3, CH3, OCH3 | naphthalene with OH, NH2, CH3, SO3H |
| 1340 | naphthalene with HO3S, HO3S, CH3, OH | benzene with OC2H4OCH3, CH3, CH3, NHCOCH3 | naphthalene with OH, CH3, HO3S, NH2 |

TABLE 38-continued

| Compound No. | B | A | C |
|---|---|---|---|
| 1341 | | | |
| 1342 | | | |
| 1343 | | | |
| 1344 | | | |
| 1345 | | | |
| 1346 | | | |

TABLE 39
| Compound No. | B | A | C |
|---|---|---|---|
| 1347 | 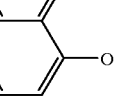 | 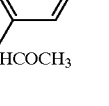 | 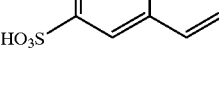 |
| 1348 | 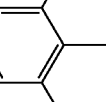 | 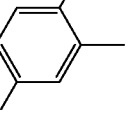 | 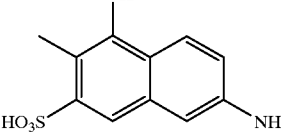 |
| 1349 | 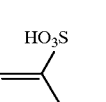 | 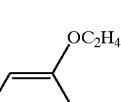 | 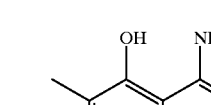 |
| 1350 | 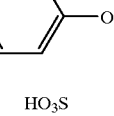 |  |  |
| 1351 | 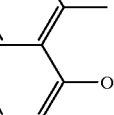 |  | 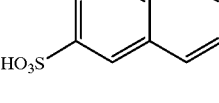 |
| 1352 | 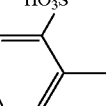 | 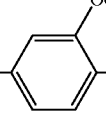 | 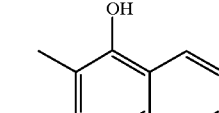 |
| 1353 | 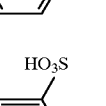 | 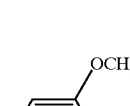 |  |

TABLE 39-continued

| Compound No. | B | A | C |
|---|---|---|---|
| 1354 | naphthalene with HO3S, HO3S, CH3, OH substituents | 1,2,4,5-tetrasubstituted benzene with CH3, CH3, CH3 | naphthalene with OH, CH3, HO3S, NH2 substituents |
| 1355 | naphthalene with HO3S, HO3S, CH3, OH substituents | 1,2,4,5-tetrasubstituted benzene with CH3, CH3, CH3 | naphthalene with OH, CH3, HO3S, NH-phenyl-SO3H |
| 1356 | naphthalene with HO3S, HO3S, CH3, OH substituents | benzene with OC2H5, CH3, CH3, OC2H5 | naphthalene with OH, CH3, HO3S, NH2 |

TABLE 40

| Compound No. | B | A | C |
|---|---|---|---|
| 1357 | naphthalene with HO3S, HO3S, CH3, OH substituents | benzene with OC2H5, CH3, CH3, OC2H5 | naphthalene with OH, CH3, HO3S, NH-phenyl-SO3H |
| 1358 | naphthalene with HO3S, HO3S, CH3, OH substituents | benzene with CH3, CH3, NHCOCH2OCH3 | naphthalene with OH, CH3, HO3S, NH2 |
| 1359 | naphthalene with HO3S, HO3S, CH3, OH substituents | benzene with CH3, CH3, NHCONH2 | naphthalene with OH, CH3, HO3S, NH2 |

TABLE 40-continued

| Compound No. | B | A | C |
|---|---|---|---|
| 1360 | 8-methyl-4-hydroxy-naphthalene-1,6-disulfonic acid (HO₃S, OH, HO₃S substituents) | 2,4-dimethylbenzene (CH₃) | 1-hydroxy-2-methyl-6-amino-naphthalene-3-sulfonic acid (OH, NH₂, HO₃S) |
| 1361 | 8-methyl-4-hydroxy-naphthalene-1,6-disulfonic acid | 2,4-dimethylbenzene (CH₃) | 1-hydroxy-2-methyl-6-(methylamino)-naphthalene-3-sulfonic acid (OH, NHCH₃, HO₃S) |
| 1362 | 8-methyl-4-hydroxy-naphthalene-1,6-disulfonic acid | 2,4-dimethylbenzene (CH₃) | 1-hydroxy-2-methyl-6-(phenylamino)-naphthalene-3-sulfonic acid (OH, NH-phenyl, HO₃S) |
| 1363 | 8-methyl-4-hydroxy-naphthalene-1,6-disulfonic acid | 2,4-dimethylbenzene (CH₃) | 1-hydroxy-2-methyl-6-[(3-sulfophenyl)amino]-naphthalene-3-sulfonic acid (OH, NH-C₆H₄-SO₃H, HO₃S) |
| 1364 | 8-methyl-4-hydroxy-naphthalene-1,6-disulfonic acid | 2,4-dimethylbenzene (CH₃) | 1-hydroxy-2-methyl-6-[(4-carboxyphenyl)amino]-naphthalene-3-sulfonic acid (OH, NH-C₆H₄-COOH, HO₃S) |
| 1365 | 8-methyl-4-hydroxy-naphthalene-1,6-disulfonic acid | 2,4-dimethylbenzene (CH₃) | 1-hydroxy-2-methyl-6-(benzoylamino)-naphthalene-3-sulfonic acid (OH, NHCO-phenyl, HO₃S) |

TABLE 40-continued

| Compound No. | B | A | C |
|---|---|---|---|
| 1366 | [naphthalene with HO₃S, CH₃, OH, HO₃S substituents] | [benzene with two CH₃ substituents] | [naphthalene with OH, CH₃, HO₃S, NHCH₂-phenyl substituents] |

TABLE 41

| Compound No. | B | A | C |
|---|---|---|---|
| 1367 | [naphthalene with HO₃S, CH₃, OH, HO₃S substituents] | [benzene with two CH₃ substituents] | [naphthalene with OH, CH₃, HO₃S, NH₂ substituents] |
| 1368 | [naphthalene with HO₃S, CH₃, OH, HO₃S substituents] | [benzene with two CH₃ substituents] | [naphthalene with OH, CH₃, HO₃S, NH-phenyl substituents] |
| 1369 | [naphthalene with HO₃S, CH₃, OH, HO₃S substituents] | [benzene with two CH₃ substituents] | [naphthalene with OH, NH₂, CH₃, SO₃H substituents] |
| 1370 | [naphthalene with HO₃S, CH₃, OH, HO₃S substituents] | [benzene with OCH₃, two CH₃, CH₃ substituents] | [naphthalene with OH, CH₃, HO₃S, NH₂ substituents] |
| 1371 | [naphthalene with HO₃S, CH₃, OH, HO₃S substituents] | [benzene with OCH₃, two CH₃, CH₃ substituents] | [naphthalene with OH, CH₃, HO₃S, NHCH₃ substituents] |

TABLE 41-continued

| Compound No. | B | A | C |
|---|---|---|---|
| 1372 | naphthalene with HO₃S, CH₃, OH, HO₃S substituents | 2,5-dimethyl-4-methoxy (OCH₃, CH₃, CH₃) benzene | 1-hydroxy-2-methyl-3-sulfo-6-(phenylamino)naphthalene |
| 1373 | naphthalene with HO₃S, CH₃, OH, HO₃S substituents | 2,5-dimethyl-4-methoxy (OCH₃, CH₃, CH₃) benzene | 1-hydroxy-2-methyl-3-sulfo-6-[(3-sulfophenyl)amino]naphthalene |
| 1374 | naphthalene with HO₃S, CH₃, OH, HO₃S substituents | 2,5-dimethyl-4-methoxy (OCH₃, CH₃, CH₃) benzene | 1-hydroxy-2-methyl-3-sulfo-6-[(4-carboxyphenyl)amino]naphthalene |
| 1375 | naphthalene with HO₃S, CH₃, OH, HO₃S substituents | 2,5-dimethyl-4-methoxy (OCH₃, CH₃, CH₃) benzene | 1-hydroxy-2-methyl-3-sulfo-6-(benzoylamino)naphthalene |
| 1376 | naphthalene with HO₃S, CH₃, OH, HO₃S substituents | 2,5-dimethyl-4-methoxy (OCH₃, CH₃, CH₃) benzene | 1-hydroxy-2-methyl-3-sulfo-6-(benzylamino)naphthalene |

TABLE 42

| Compound No. | B | A | C |
|---|---|---|---|
| 1377 | 8-methyl-4-hydroxy-naphthalene-1,6-disulfonic acid (HO₃S at 1,6; OH at 4; CH₃ at 8) | 2-methoxy-4,5-dimethyl substituted benzene (OCH₃, CH₃, CH₃) | 1-hydroxy-2-methyl-6-amino-naphthalene-3-sulfonic acid |
| 1378 | same as 1377 | same as 1377 | 1-hydroxy-2-methyl-6-(phenylamino)-naphthalene-3-sulfonic acid |
| 1379 | same as 1377 | same as 1377 | 4-amino-5-hydroxy-6-methyl-naphthalene-1-sulfonic acid |
| 1380 | same as 1377 | 2-methoxy-4-(NHCOCH₃)-5-methyl benzene with CH₃ | 1-hydroxy-2-methyl-6-amino-naphthalene-3-sulfonic acid |
| 1381 | same as 1377 | same as 1380 | 1-hydroxy-2-methyl-6-(NHCH₃)-naphthalene-3-sulfonic acid |
| 1382 | same as 1377 | same as 1380 | 1-hydroxy-2-methyl-6-(phenylamino)-naphthalene-3-sulfonic acid |

TABLE 42-continued
| Compound No. | B | A | C |
|---|---|---|---|
| 1383 | 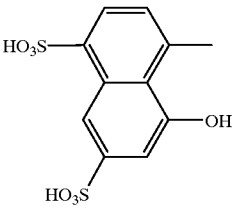 | 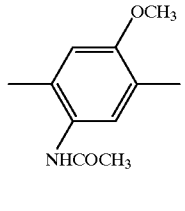 | 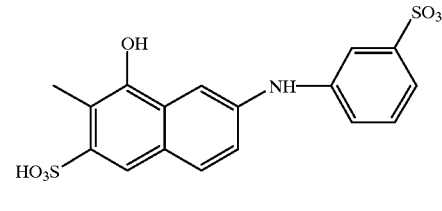 |
| 1384 | 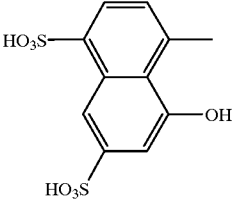 | 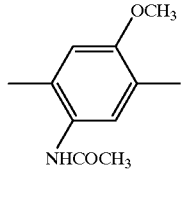 | 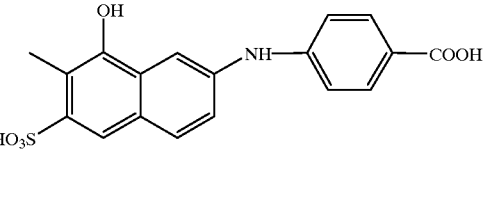 |
| 1385 | 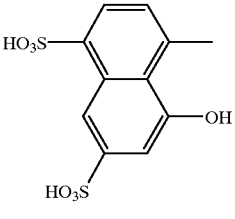 |  | 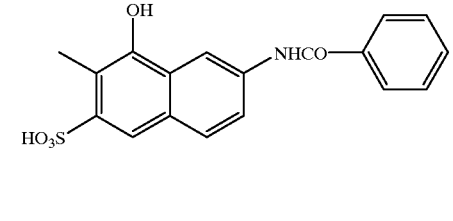 |
| 1386 | 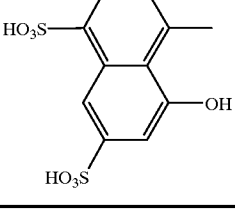 |  | 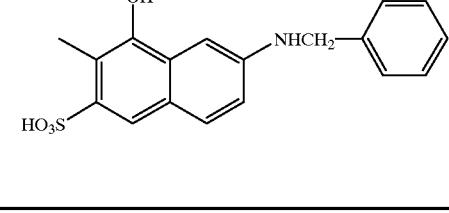 |
TABLE 43
| Compound No. | B | A | C |
|---|---|---|---|
| 1387 | 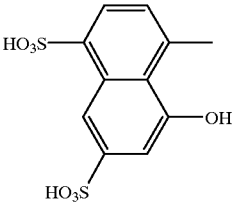 | 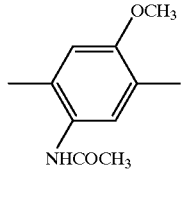 | 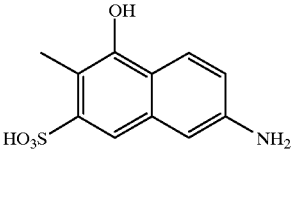 |
| 1388 | 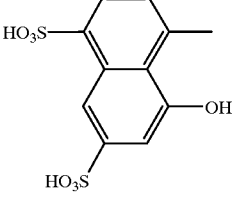 | 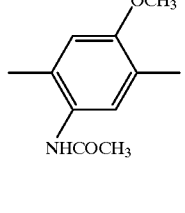 | 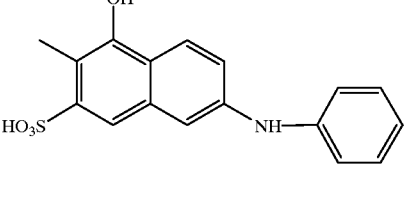 |

TABLE 43-continued

| Compound No. | B | A | C |
|---|---|---|---|
| 1389 | | | |
| 1390 | | | |
| 1391 | | | |
| 1392 | | | |
| 1393 | | | |
| 1394 | | | |

TABLE 43-continued

| Compound No. | B | A | C |
|---|---|---|---|
| 1395 | 4-methyl-5,7-disulfo-1-naphthol (HO₃S at 5,7; CH₃ at 4; OH at 1) | 1,4-dimethoxy-2,5-dimethylbenzene | 1-hydroxy-2-methyl-3-sulfo-7-(phenylcarbonylamino)naphthalene (NHCOPh) |
| 1396 | 4-methyl-5,7-disulfo-1-naphthol | 1,4-dimethoxy-2,5-dimethylbenzene | 1-hydroxy-2-methyl-3-sulfo-7-(benzylamino)naphthalene (NHCH₂Ph) |

TABLE 44

| Compound No. | B | A | C |
|---|---|---|---|
| 1397 | 4-methyl-5,7-disulfo-1-naphthol | 1,4-dimethoxy-2,5-dimethylbenzene | 1-hydroxy-2-methyl-3-sulfo-7-amino-naphthalene |
| 1398 | 4-methyl-5,7-disulfo-1-naphthol | 1,4-dimethoxy-2,5-dimethylbenzene | 1-hydroxy-2-methyl-3-sulfo-7-(phenylamino)naphthalene |
| 1399 | 4-methyl-5,7-disulfo-1-naphthol | 1,4-dimethoxy-2,5-dimethylbenzene | 1-hydroxy-2-methyl-4-amino-5-sulfonaphthalene |
| 1400 | 4-methyl-5,7-disulfo-1-naphthol | 1-(2-methoxyethoxy)-4-acetamido-2,5-dimethylbenzene (OC₂H₄OCH₃, NHCOCH₃) | 1-hydroxy-2-methyl-3-sulfo-7-amino-naphthalene |

TABLE 44-continued

| Compound No. | B | A | C |
|---|---|---|---|
| 1401 | naphthalene with HO₃S, CH₃, OH, HO₃S substituents | benzene with OC₂H₄OCH₃, two CH₃, NHCOCH₃ | naphthalene with OH, CH₃, HO₃S, NHCH₃ |
| 1402 | naphthalene with HO₃S, CH₃, OH, HO₃S substituents | benzene with OC₂H₄OCH₃, two CH₃, NHCOCH₃ | naphthalene with OH, CH₃, HO₃S, NH-phenyl |
| 1403 | naphthalene with HO₃S, CH₃, OH, HO₃S substituents | benzene with OC₂H₄OCH₃, two CH₃, NHCOCH₃ | naphthalene with OH, CH₃, HO₃S, NH-(3-SO₃H-phenyl) |
| 1404 | naphthalene with HO₃S, CH₃, OH, HO₃S substituents | benzene with OC₂H₄OCH₃, two CH₃, NHCOCH₃ | naphthalene with OH, CH₃, HO₃S, NH-(4-COOH-phenyl) |
| 1405 | naphthalene with HO₃S, CH₃, OH, HO₃S substituents | benzene with OC₂H₄OCH₃, two CH₃, NHCOCH₃ | naphthalene with OH, CH₃, HO₃S, NHCO-phenyl |
| 1406 | naphthalene with HO₃S, CH₃, OH, HO₃S substituents | benzene with OC₂H₄OCH₃, two CH₃, NHCOCH₃ | naphthalene with OH, CH₃, HO₃S, NHCH₂-phenyl |

TABLE 45

| Compound No. | B | A | C |
| --- | --- | --- | --- |
| 1407 | | | |
| 1408 | | | |
| 1409 | | | |
| 1410 | | | |
| 1411 | | | |
| 1412 | | | |

TABLE 45-continued

| Compound No. | B | A | C |
| --- | --- | --- | --- |
| 1413 | 4,6-disulfo-8-methyl-1-naphthol | 2,5-dimethyl-NHCOC₂H₅-phenyl | 6-amino-3-methyl-2-sulfo-4-hydroxynaphthyl(NH₂) |
| 1414 | 5,7-disulfo-4-methyl-1-naphthol | 2,3,5-trimethylphenyl | 6-amino-3-methyl-2-sulfo-4-hydroxynaphthyl(NH₂) |
| 1415 | 5,7-disulfo-4-methyl-1-naphthol | 2,3,5-trimethylphenyl | 3-sulfoanilino-3-methyl-2-sulfo-1-hydroxynaphthyl |
| 1416 | 5,7-disulfo-4-methyl-1-naphthol | 2,5-bis(OC₂H₅)-phenyl | 6-amino-3-methyl-2-sulfo-4-hydroxynaphthyl(NH₂) |

TABLE 46

| Compound No. | B | A | C |
| --- | --- | --- | --- |
| 1417 | 5,7-disulfo-4-methyl-1-naphthol | 2,5-bis(OC₂H₅)-phenyl | 3-sulfoanilino-3-methyl-2-sulfo-1-hydroxynaphthyl |
| 1418 | 5,7-disulfo-4-methyl-1-naphthol | 2,5-dimethyl-NHCOCH₂OCH₃-phenyl | 6-amino-3-methyl-2-sulfo-4-hydroxynaphthyl(NH₂) |

TABLE 46-continued

| Compound No. | B | A | C |
|---|---|---|---|
| 1419 | (naphthalene with HO₃S, CH₃, OH, HO₃S substituents) | (benzene with CH₃, CH₃, NHCONH₂ substituents) | (naphthalene with OH, CH₃, HO₃S, NH₂ substituents) |

TABLE 47

| Compound No. | B | A | C |
|---|---|---|---|
| 2001 | (naphthalene with HO₃S, CH₃, OH substituents) | (naphthalene with OCH₃, CH₃, CH₃, HO₃S substituents) | (naphthalene with OH, CH₃, HO₃S, NH₂ substituents) |
| 2002 | (naphthalene with HO₃S, CH₃, OH substituents) | (naphthalene with CH₃, CH₃ substituents) | (naphthalene with OH, CH₃, HO₃S, NH₂ substituents) |
| 2003 | (naphthalene with HO₃S, CH₃, OH substituents) | (naphthalene with OCH₃, CH₃, CH₃, HO₃S substituents) | (naphthalene with OH, CH₃, HO₃S, NH₂ substituents) |
| 2004 | (naphthalene with HO₃S, CH₃, OH substituents) | (naphthalene with CH₃, CH₃ substituents) | (naphthalene with OH, CH₃, HO₃S, NH₂ substituents) |

TABLE 47-continued

| Compound No. | B | A | C |
|---|---|---|---|
| 2005 | | | |
| 2006 | | | |
| 2007 | | | |
| 2008 | | | |

TABLE 48

| Compound No. | B | A | C |
|---|---|---|---|
| 2009 | | | |

TABLE 48-continued

| Compound No. | B | A | C |
|---|---|---|---|
| 2010 | 3-HO₃S, 8-methyl, 5-OH naphthalene | 1,4-dimethyl, 6-HO₃S naphthalene | 1-OH, 2-methyl, 3-HO₃S, 6-NHCH₃ naphthalene |
| 2011 | 3-HO₃S, 8-methyl, 5-OH naphthalene | 1,4-dimethyl, 6-HO₃S naphthalene | 1-OH, 2-methyl, 3-HO₃S, 6-NH-phenyl naphthalene |
| 2012 | 3-HO₃S, 8-methyl, 5-OH naphthalene | 1,4-dimethyl, 6-HO₃S naphthalene | 1-OH, 2-methyl, 3-HO₃S, 6-NH-(3-SO₃H-phenyl) naphthalene |
| 2013 | 3-HO₃S, 8-methyl, 5-OH naphthalene | 1,4-dimethyl, 6-HO₃S naphthalene | 1-OH, 2-methyl, 3-HO₃S, 6-NH-(4-COOH-phenyl) naphthalene |
| 2014 | 3-HO₃S, 8-methyl, 5-OH naphthalene | 1,4-dimethyl, 6-HO₃S naphthalene | 1-OH, 2-methyl, 3-HO₃S, 6-NHCO-phenyl naphthalene |
| 2015 | 3-HO₃S, 8-methyl, 5-OH naphthalene | 1,4-dimethyl, 6-HO₃S naphthalene | 1-OH, 2-methyl, 3-HO₃S, 6-NHCH₂-phenyl naphthalene |

TABLE 48-continued
| Compound No. | B | A | C |
|---|---|---|---|
| 2016 | 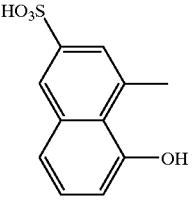 | 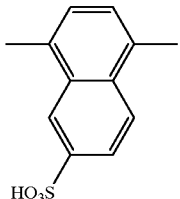 | 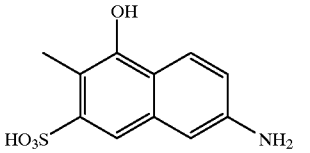 |
| 2017 | 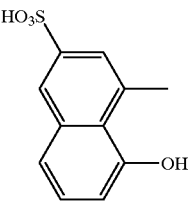 | 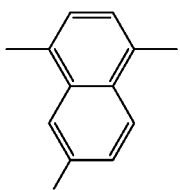 | 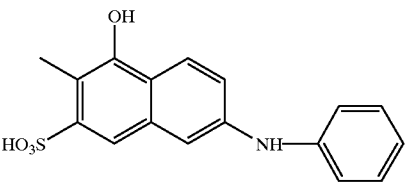 |
| 2018 | 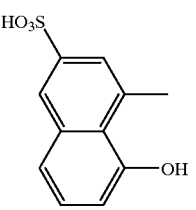 | 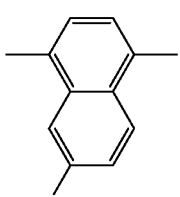 | 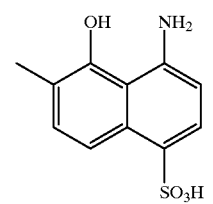 |
TABLE 49
| Compound No. | B | A | C |
|---|---|---|---|
| 2019 | 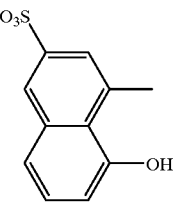 | 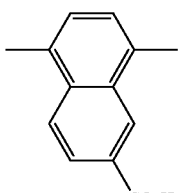 | 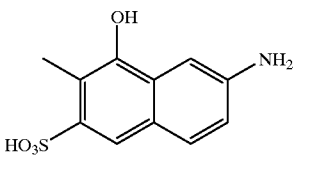 |
| 2020 | 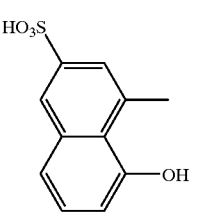 | 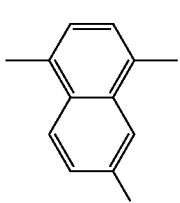 | 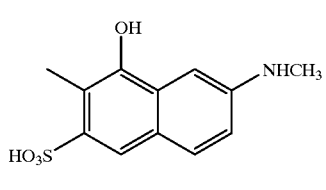 |
| 2021 | 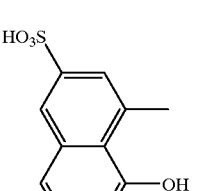 | 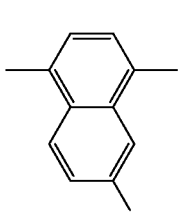 | 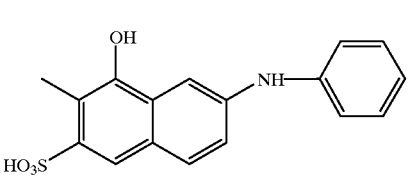 |

TABLE 49-continued

| Compound No. | B | A | C |
|---|---|---|---|
| 2022 | 3-HO3S, 8-methyl, 5-OH naphthalene | 1,5-dimethyl-7-sulfo naphthalene | 7-(3-sulfophenylamino)-1-hydroxy-2-methyl-3-sulfo naphthalene |
| 2023 | 3-HO3S, 8-methyl, 5-OH naphthalene | 1,5-dimethyl-7-sulfo naphthalene | 7-(4-carboxyphenylamino)-1-hydroxy-2-methyl-3-sulfo naphthalene |
| 2024 | 3-HO3S, 8-methyl, 5-OH naphthalene | 1,5-dimethyl-7-sulfo naphthalene | 7-(benzoylamino)-1-hydroxy-2-methyl-3-sulfo naphthalene |
| 2025 | 3-HO3S, 8-methyl, 5-OH naphthalene | 1,5-dimethyl-7-sulfo naphthalene | 7-(benzylamino)-1-hydroxy-2-methyl-3-sulfo naphthalene |
| 2026 | 3-HO3S, 8-methyl, 5-OH naphthalene | 1,5-dimethyl-7-sulfo naphthalene | 7-amino-1-hydroxy-2-methyl-3-sulfo naphthalene |
| 2027 | 3-HO3S, 8-methyl, 5-OH naphthalene | 1,5-dimethyl-7-sulfo naphthalene | 7-(phenylamino)-1-hydroxy-2-methyl-3-sulfo naphthalene |

TABLE 49-continued

| Compound No. | B | A | C |
|---|---|---|---|
| 2028 | (naphthalene with HO₃S, CH₃, OH) | (naphthalene with CH₃, CH₃, SO₃H) | (naphthalene with OH, NH₂, CH₃, SO₃H) |

TABLE 50

| Compound No. | B | A | C |
|---|---|---|---|
| 2029 | (naphthalene with HO₃S, CH₃, OH) | (naphthalene with CH₃, CH₃, HO₃S) | (naphthalene with OH, CH₃, HO₃S, NH₂) |
| 2030 | (naphthalene with HO₃S, CH₃, OH) | (naphthalene with CH₃, CH₃, HO₃S) | (naphthalene with OH, CH₃, HO₃S, NHCH₃) |
| 2031 | (naphthalene with HO₃S, CH₃, OH) | (naphthalene with CH₃, CH₃, HO₃S) | (naphthalene with OH, CH₃, HO₃S, NH-phenyl) |
| 2032 | (naphthalene with HO₃S, CH₃, OH) | (naphthalene with CH₃, CH₃, HO₃S) | (naphthalene with OH, CH₃, HO₃S, NH-C₆H₄-SO₃H) |
| 2033 | (naphthalene with HO₃S, CH₃, OH) | (naphthalene with CH₃, CH₃, HO₃S) | (naphthalene with OH, CH₃, HO₃S, NH-C₆H₄-COOH) |

TABLE 50-continued
| Compound No. | B | A | C |
|---|---|---|---|
| 2034 | 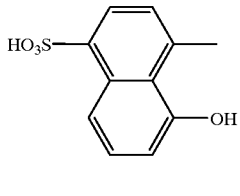 | 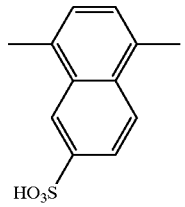 | 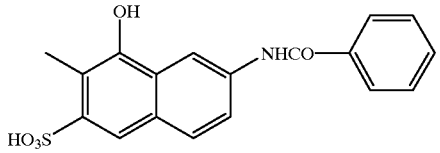 |
| 2035 | 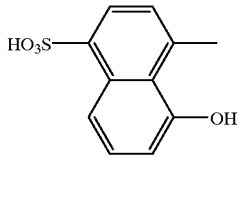 | 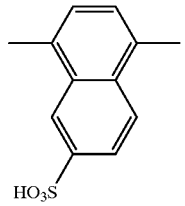 | 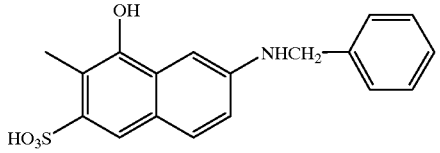 |
| 2036 | 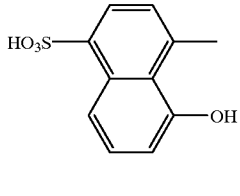 | 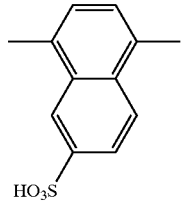 | 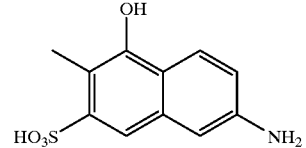 |
| 2037 | 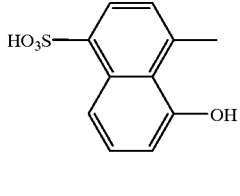 | 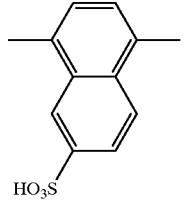 | 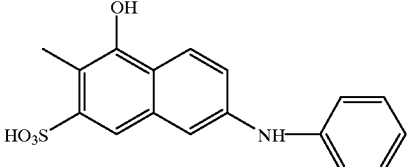 |
| 2038 | 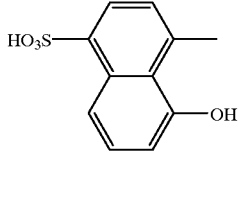 | 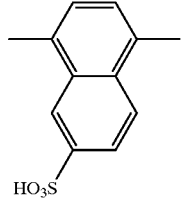 | 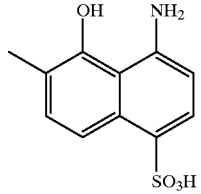 |
TABLE 51
| Compound No. | B | A | C |
|---|---|---|---|
| 2039 | 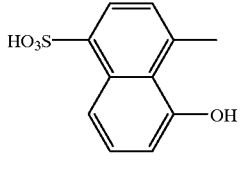 | 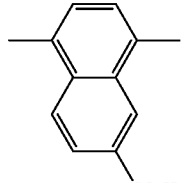 | 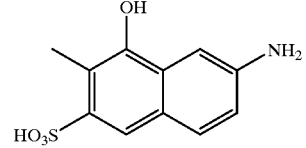 |

TABLE 51-continued

| Compound No. | B | A | C |
|---|---|---|---|
| 2040 | 8-methyl-5-hydroxynaphthalene-1-sulfonic acid (HO₃S, OH, CH₃) | 1,5-dimethylnaphthalene-7-sulfonic acid (SO₃H) | 1-hydroxy-2-methyl-6-(methylamino)naphthalene-3-sulfonic acid (OH, NHCH₃, HO₃S) |
| 2041 | 8-methyl-5-hydroxynaphthalene-1-sulfonic acid | 1,5-dimethylnaphthalene-7-sulfonic acid | 1-hydroxy-2-methyl-6-(phenylamino)naphthalene-3-sulfonic acid (OH, NH-C₆H₅, HO₃S) |
| 2042 | 8-methyl-5-hydroxynaphthalene-1-sulfonic acid | 1,5-dimethylnaphthalene-7-sulfonic acid | 1-hydroxy-2-methyl-6-[(3-sulfophenyl)amino]naphthalene-3-sulfonic acid (OH, NH-C₆H₄-SO₃H, HO₃S) |
| 2043 | 8-methyl-5-hydroxynaphthalene-1-sulfonic acid | 1,5-dimethylnaphthalene-7-sulfonic acid | 1-hydroxy-2-methyl-6-[(4-carboxyphenyl)amino]naphthalene-3-sulfonic acid (OH, NH-C₆H₄-COOH, HO₃S) |
| 2044 | 8-methyl-5-hydroxynaphthalene-1-sulfonic acid | 1,5-dimethylnaphthalene-7-sulfonic acid | 1-hydroxy-2-methyl-6-(benzoylamino)naphthalene-3-sulfonic acid (OH, NHCO-C₆H₅, HO₃S) |
| 2045 | 8-methyl-5-hydroxynaphthalene-1-sulfonic acid | 1,5-dimethylnaphthalene-7-sulfonic acid | 1-hydroxy-2-methyl-6-(benzylamino)naphthalene-3-sulfonic acid (OH, NHCH₂-C₆H₅, HO₃S) |

TABLE 51-continued
| Compound No. | B | A | C |
|---|---|---|---|
| 2046 | 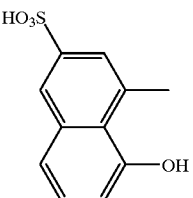 | 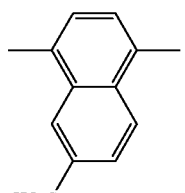 | 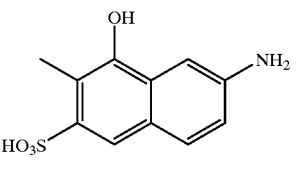 |
| 2047 | | | |
| 2048 | | | |
TABLE 52
| Compound No. | B | A | C |
|---|---|---|---|
| 2049 | 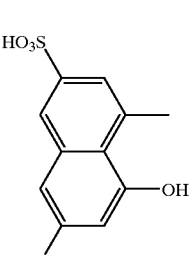 | 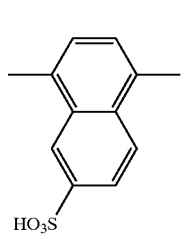 | 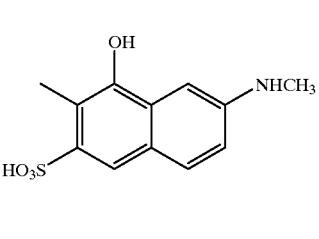 |
| 2050 | | | |

TABLE 52-continued
| Compound No. | B | A | C |
|---|---|---|---|
| 2051 | 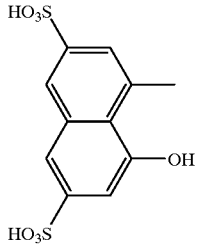 | 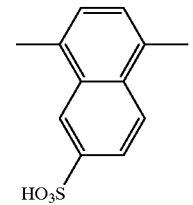 | 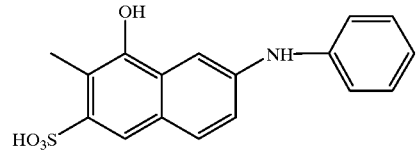 |
| 2052 | 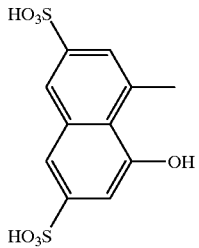 | 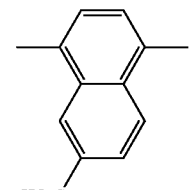 | 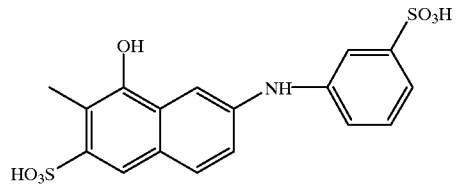 |
| 2053 | 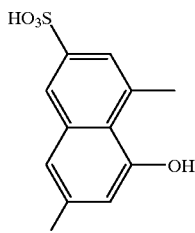 | 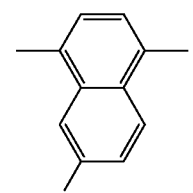 | 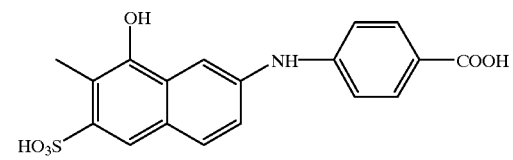 |
| 2054 | 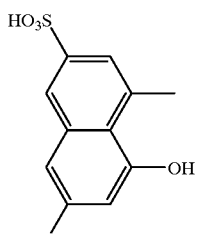 | 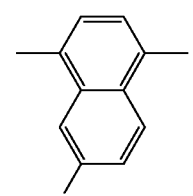 | 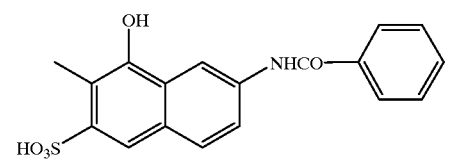 |
| 2055 | 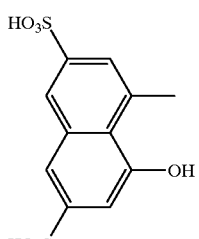 | 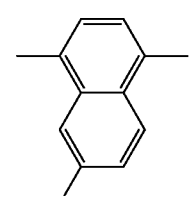 | 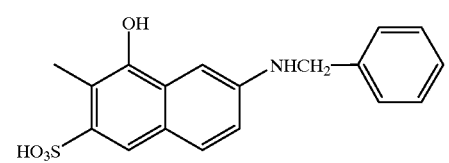 |

TABLE 52-continued

| Compound No. | B | A | C |
|---|---|---|---|
| 2056 | naphthalene with HO₃S, HO₃S, CH₃, OH substituents | dimethyl naphthalene with HO₃S | naphthalene with OH, CH₃, HO₃S, NH₂ substituents |
| 2057 | naphthalene with HO₃S, HO₃S, CH₃, OH substituents | dimethyl naphthalene with HO₃S | naphthalene with OH, CH₃, HO₃S, NH-phenyl substituents |

TABLE 53

| Compound No. | B | A | C |
|---|---|---|---|
| 2058 | naphthalene with HO₃S, HO₃S, CH₃, OH substituents | dimethyl naphthalene with HO₃S | naphthalene with OH, CH₃, NH₂, SO₃H substituents |
| 2059 | naphthalene with HO₃S, HO₃S, CH₃, OH substituents | dimethyl naphthalene with SO₃H | naphthalene with OH, CH₃, HO₃S, NH₂ substituents |
| 2060 | naphthalene with HO₃S, HO₃S, CH₃, OH substituents | dimethyl naphthalene with SO₃H | naphthalene with OH, CH₃, HO₃S, NHCH₃ substituents |

TABLE 53-continued

| Compound No. | B | A | C |
|---|---|---|---|
| 2061 | 6,8-disulfo-4-methyl-1-hydroxynaphthalene (HO₃S groups at 3,6; methyl at 8; OH at 4) | 4,8-dimethylnaphthalene-2-sulfonic acid | 1-hydroxy-2-methyl-3-sulfo-6-(phenylamino)naphthalene |
| 2062 | same B as 2061 | same A as 2061 | 1-hydroxy-2-methyl-3-sulfo-6-(3-sulfophenylamino)naphthalene |
| 2063 | same B as 2061 | same A as 2061 | 1-hydroxy-2-methyl-3-sulfo-6-(4-carboxyphenylamino)naphthalene |
| 2064 | same B as 2061 | same A as 2061 | 1-hydroxy-2-methyl-3-sulfo-6-(benzoylamino)naphthalene |
| 2065 | same B as 2061 | same A as 2061 | 1-hydroxy-2-methyl-3-sulfo-6-(benzylamino)naphthalene |

TABLE 53-continued

| Compound No. | B | A | C |
|---|---|---|---|
| 2066 | (naphthalene with HO₃S, CH₃, OH, HO₃S substituents) | (naphthalene with two CH₃ and SO₃H substituents) | (naphthalene with OH, CH₃, HO₃S, NH₂ substituents) |

TABLE 54

| Compound No. | B | A | C |
|---|---|---|---|
| 2067 | (naphthalene with HO₃S, CH₃, OH, HO₃S substituents) | (naphthalene with two CH₃ and SO₃H substituents) | (naphthalene with OH, CH₃, HO₃S, NHPh substituents) |
| 2068 | (naphthalene with HO₃S, CH₃, OH, HO₃S substituents) | (naphthalene with two CH₃ and SO₃H substituents) | (naphthalene with OH, CH₃, NH₂, SO₃H substituents) |
| 2069 | (naphthalene with HO₃S, HO₃S, CH₃, OH substituents) | (naphthalene with two CH₃ and HO₃S substituents) | (naphthalene with OH, CH₃, HO₃S, NH₂ substituents) |
| 2070 | (naphthalene with HO₃S, HO₃S, CH₃, OH substituents) | (naphthalene with two CH₃ and HO₃S substituents) | (naphthalene with OH, CH₃, HO₃S, NHCH₃ substituents) |

TABLE 54-continued

| Compound No. | B | A | C |
|---|---|---|---|
| 2071 | 4-methyl-5-hydroxy-naphthalene-2,7-disulfonic acid (HO₃S, HO₃S, CH₃, OH) | 1,5-dimethylnaphthalene-3-sulfonic acid | 1-hydroxy-2-methyl-6-(phenylamino)naphthalene-3-sulfonic acid |
| 2072 | 4-methyl-5-hydroxy-naphthalene-2,7-disulfonic acid | 1,5-dimethylnaphthalene-3-sulfonic acid | 1-hydroxy-2-methyl-6-((3-sulfophenyl)amino)naphthalene-3-sulfonic acid |
| 2073 | 4-methyl-5-hydroxy-naphthalene-2,7-disulfonic acid | 1,5-dimethylnaphthalene-3-sulfonic acid | 1-hydroxy-2-methyl-6-((4-carboxyphenyl)amino)naphthalene-3-sulfonic acid |
| 2074 | 4-methyl-5-hydroxy-naphthalene-2,7-disulfonic acid | 1,5-dimethylnaphthalene-3-sulfonic acid | 1-hydroxy-2-methyl-6-(benzamido)naphthalene-3-sulfonic acid |
| 2075 | 4-methyl-5-hydroxy-naphthalene-2,7-disulfonic acid | 1,5-dimethylnaphthalene-3-sulfonic acid | 1-hydroxy-2-methyl-6-(benzylamino)naphthalene-3-sulfonic acid |

TABLE 55

| Compound No. | B | A | C |
|---|---|---|---|
| 2076 | 4-methyl-5-hydroxy-naphthalene-2,7-disulfonic acid | 1,5-dimethylnaphthalene-3-sulfonic acid | 6-amino-1-hydroxy-2-methylnaphthalene-3-sulfonic acid |

TABLE 55-continued

| Compound No. | B | A | C |
| --- | --- | --- | --- |
| 2077 | | | |
| 2078 | | | |
| 2079 | | | |
| 2080 | | | |
| 2081 | | | |
| 2082 | | | |

TABLE 55-continued

| Compound No. | B | A | C |
|---|---|---|---|
| 2083 | naphthalene with HO₃S, HO₃S, CH₃, OH substituents | naphthalene with two CH₃ and SO₃H | naphthalene with OH, CH₃, HO₃S, NH-C₆H₄-COOH |
| 2084 | naphthalene with HO₃S, HO₃S, CH₃, OH substituents | naphthalene with two CH₃ and SO₃H | naphthalene with OH, CH₃, HO₃S, NHCO-phenyl |
| 2085 | naphthalene with HO₃S, HO₃S, CH₃, OH substituents | naphthalene with two CH₃ and SO₃H | naphthalene with OH, CH₃, HO₃S, NHCH₂-phenyl |

TABLE 56

| Compound No. | B | A | C |
|---|---|---|---|
| 2086 | naphthalene with HO₃S, HO₃S, CH₃, OH substituents | naphthalene with two CH₃ and SO₃H | naphthalene with OH, CH₃, HO₃S, NH₂ |
| 2087 | naphthalene with HO₃S, HO₃S, CH₃, OH substituents | naphthalene with two CH₃ and SO₃H | naphthalene with OH, CH₃, HO₃S, NH-phenyl |
| 2088 | naphthalene with HO₃S, HO₃S, CH₃, OH substituents | naphthalene with two CH₃ and SO₃H | naphthalene with OH, CH₃, NH₂, SO₃H |

TABLE 56-continued

| Compound No. | B | A | C |
|---|---|---|---|
| 2089 | naphthalene with HO₃S, CH₃, OH, HO₃S substituents | dimethylnaphthalene with HO₃S | naphthalene with OH, CH₃, HO₃S, NH₂ substituents |
| 2090 | naphthalene with HO₃S, CH₃, OH, HO₃S substituents | dimethylnaphthalene with HO₃S | naphthalene with OH, CH₃, HO₃S, NHCH₃ substituents |
| 2091 | naphthalene with HO₃S, CH₃, OH, HO₃S substituents | dimethylnaphthalene with HO₃S | naphthalene with OH, CH₃, HO₃S, NH-phenyl substituents |
| 2092 | naphthalene with HO₃S, CH₃, OH, HO₃S substituents | dimethylnaphthalene with HO₃S | naphthalene with OH, CH₃, HO₃S, NH-(3-sulfophenyl) substituents |
| 2093 | naphthalene with HO₃S, CH₃, OH, HO₃S substituents | dimethylnaphthalene with HO₃S | naphthalene with OH, CH₃, HO₃S, NH-(4-carboxyphenyl) substituents |
| 2094 | naphthalene with HO₃S, CH₃, OH, HO₃S substituents | dimethylnaphthalene with HO₃S | naphthalene with OH, CH₃, HO₃S, NHCO-phenyl substituents |

6,143,062
TABLE 56-continued
| Compound No. | B | A | C |
|---|---|---|---|
| 2095 | 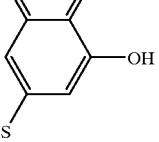 | 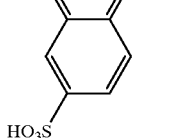 | 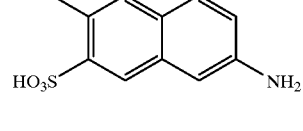 |
TABLE 57
| Compound No. | B | A | C |
|---|---|---|---|
| 2096 | 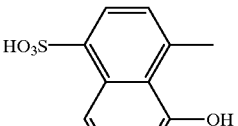 | 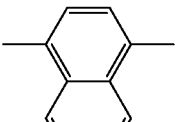 | 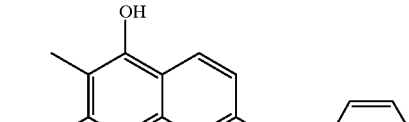 |
| 2097 | 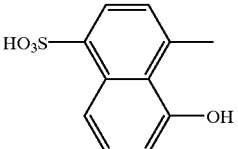 | 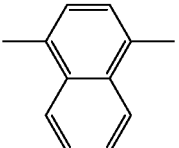 | 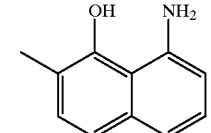 |
| 2098 | 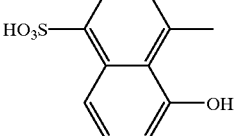 | 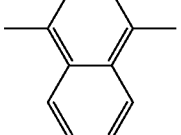 | 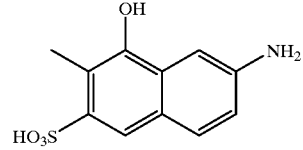 |
| 2099 | 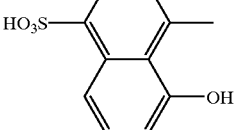 | 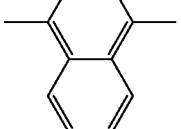 | 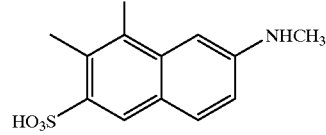 |
| 2100 | | | |

TABLE 57-continued

| Compound No. | B | A | C |
| --- | --- | --- | --- |
| 2101 | | | |
| 2102 | | | |
| 2103 | | | |
| 2104 | | | |
| 2105 | | | |

TABLE 58

| Compound No. | B | A | C |
| --- | --- | --- | --- |
| 2106 | | | |

TABLE 58-continued

| Compound No. | B | A | C |
|---|---|---|---|
| 2107 | | | |
| 2108 | | | |
| 2109 | | | |
| 2110 | | | |
| 2111 | | | |
| 2112 | | | |

TABLE 58-continued

| Compound No. | B | A | C |
|---|---|---|---|
| 2113 |  | | |
| 2114 | | | |
| 2115 | | | |

Preferred embodiments of the compounds of the general formula (1) are:

(1) disazo compounds wherein the salt is a salt selected from lithium salt, sodium salt, potassium salt or ammonium salt of the general formula (4):

$$X^2-\underset{\underset{X^3}{|}}{\overset{\overset{X^1}{|}}{N}}-X^4 \quad (4)$$

wherein each of $X^1$ to $X^4$ represents independently a hydrogen atom, or, a $C_1$–$C_4$ alkyl, hydroxy-($C_1$–$C_4$) alkyl or hydroxyethoxy-($C_1$–$C_4$)alkyl group. Other preferred embodiments are as set forth in the following:

(2) disazo compounds or the salts thereof wherein when A in the formula (1) is represented by the general formula (2), then m is 2; $R^1$ and $R^2$ represent a hydrogen atom; $R^3$ represents a hydrogen atom, or, a methoxy, ethoxy, propoxy or butoxy group; and $R^4$ represents a hydrogen atom, or, a methyl, ethyl, propyl, butyl, methoxy, ethoxy, propoxy, butoxy, acetylamino, propionylamino or butyloylamino group;

(3) disazo compounds or the salts thereof wherein when A in the formula (1) is represented by the general formula (2), then m is 2; $R^1$ represents a hydrogen atom; $R^2$ represents a phenyl, benzoyl or benzyl group which may be optionally substituted; $R^3$ represents a hydrogen atom, or, a methoxy, ethoxy, propoxy or butoxy group; and $R^4$ represents a hydrogen atom, or, a methyl, ethyl, propyl, butyl, methoxy, ethoxy, propoxy, butoxy, acetylamino, propionylamino or butyloylamino group;

(4) disazo compounds or the salts thereof wherein when A in the formula (1) is represented by the general formula (2), then m is 2; $R^1$ and $R^2$ represent a hydrogen atom; $R^3$ represents a methoxymethoxy, methoxyethoxy, methoxypropoxy, methoxybutoxy, ethoxymethoxy, ethoxyethoxy, ethoxypropoxy or ethoxybutoxy group; and $R^4$ represents an acetylamino, propionylamino or butyloylamino group;

(5) disazo compounds or the salts thereof wherein when A in the formula (1) is represented by the general formula (2), then m is 2; $R^1$ represents a hydrogen atom; $R^2$ represents a phenyl, benzoyl or benzyl group which may be optionally substituted; $R^3$ represents a methoxymethoxy, methoxyethoxy, methoxypropoxy, methoxybutoxy, ethoxymethoxy, ethoxyethoxy, ethoxypropoxy, n-propoxypropoxy, i-propoxybutoxy, n-propoxybutoxy or ethoxybutoxy group; and $R^4$ represents an acetylamino, propionylamino or butyloylamino group;

(6) disazo compounds or the salts thereof wherein when A in the formula (1) is represented by the general formula (3), then m is 2; $R^1$ and $R^2$ represent a hydrogen atom; $R^5$ represents a hydrogen atom; and n is 1;

(7) disazo compounds or the salts thereof wherein when A in the formula (1) is represented by the general formula (3), then m is 2; $R^1$ represents a hydrogen atom; $R^2$ represents a phenyl, benzoyl or benzyl group which may be optionally substituted; $R^5$ represents a hydrogen atom; and n is 1.

Disazo compounds of the general formula (1) can be suitably used for dyeing blended yarn fabrics of natural and synthetic fibers. These dyes are also particularly suitable for use in the preparation of writing inks and recording liquids.

A reaction solution containing a disazo compound of the general formula (1) of the present invention can be directly used for the preparation of a recording ink composition. Alternatively, the disazo compound may be isolated from the reaction solution, dried by e.g. spray drying and processed into an ink composition. As a finished product, the recording ink composition contains a disazo compound of the general formula (1) of the present invention at a content of usually about 0.1 to 20% by weight, preferably about 1 to 10% by weight and more preferably about 2 to 8% by weight in an aqueous solution. The ink composition of the present invention may further contain 0 to 30% by weight of a water-soluble organic solvent and 0 to 5% by weight of an ink-preparing agent.

Aqueous ink compositions of the present invention may be prepared by dissolving a disazo compound of the general formula (1) in water or in an aqueous solvent (mixture of water and a water-soluble organic solvent). When these aqueous ink compositions are used in for an ink jet printer, disazo compounds having a low content of inorganic matters, such as chloride or sulfate of metallic cations, are preferred. The content is suitably of the order of 1% or less. Disazo compounds having a low content of inorganic matters may be prepared by subjecting them to conventional desalting processes e.g. using a reverse osmosis membrane.

Water-soluble organic solvents which can be mentioned are: $C_1$ to $C_4$ alkanols such as methanol, ethanol, propanol, isopropanol, butanol, isobutanol, secondary butanol, tertiary butanol and the like; carboxylic amides such as N,N-dimethylformamide, N,N-dimethylacetamide and the like; lactams such as ϵ-caprolactam, 2-pyrrolidone, N-methylpyrrolidine-2-one and the like; cyclic ureas such as 1,3-dimethylimidazolidine-2-one, 1,3-dimethylhexahydropyrimido-2-one and the like; ketones such as acetone, methylethylketone, 2-methyl-2-hydroxypentane-4-one and the like; cyclic ethers such as ketoalcohol, tetrahydrofuran, dioxane and the like; monomeric, oligomeric or polymeric alkylene glycols or thioglycols having a $C^2$–$C_6$ alkylene unit such as ethylene glycol, 1,2- or 1,3-propylene glycol, 1,2- or 1,4-butylene glycol, 1,6-hexylene glycol, diethylene glycol, triethylene glycol, tetraethylene glycol, dipropylene glycol, thiodiglycol, polyethylene glycol, polypropylene glycol and the like; polyols (triols) such as glycerin, hexane-1,2,6-triol and the like; $C^1$–$C_4$ alkyl ethers of polyhydric alcohol such as ethylene glycol monomethyl ether, ethylene glycol monoethyl ether, diethylene glycol monomethyl ether, diethylene glycol monoethyl ether, triethylene glycol monomethyl ether, triethylene glycol monoethyl ether and the like; as well as γ-butyrolactone or dimethyl sulfoxide.

Water-soluble organic solvents suitable for use in the compositions of the present invention are preferably N-methylpyrrolidine-2-one, mono-, di- or tri-ethylene glycol, dipropylene glycol and dimethyl sulfoxide. N-methylpyrrolidine-2-one, diethylene glycol and dimethyl sulfoxide are particularly preferred.

Ink preparing agents which may be mentioned are antiseptic-antimicrobial agents, pH adjusters, chelating reagents, rust preventives, water-soluble UV absorbers, water-soluble high-molecular compounds, dye dissolving agents, surface active agents and the like.

Examples of antiseptic-antimicrobial agents are anhydrous soda acetate, soda sorbate, sodium 2-pyridinethiol-1-oxide, sodium benzoate, sodium pentachlorophenol, 1,2-benzoisothiazoline-3-one and the like.

PH adjusters may be any materials, which can be blended with an ink for controlling the pH of the ink within the range of 8.0 to 11.0 without any adverse effect. Examples of pH adjusters are: alkanolamines such as diethanolamine, triethanolamine and the like; alkaline metal hydroxides such as lithium hydroxide, sodium hydroxide, potassium hydroxide and the like; ammonium hydroxide; alkaline metal carbonates such as lithium carbonate, sodium carbonate, potassium carbonate and the like.

Chelating reagents, which may be mentioned, are sodium ethylenediaminetetraacetate, sodium nitrilotriacetate, sodium hydroxyethyl ethylenediamine-triacetate, sodium diethylenetriamine pentaacetate, sodium uracil diacetate and the like.

Rust preventives which may be mentioned are acidic sulfites, sodium thiosulfate, ammonium thioglycolate, di-isopropylammonium nitrite, penta-erythritol tetranitrate, dicyclohexylammonium nitrite and the like.

Examples of water-soluble UV absorbers are sulfonated benzophenone, sulfonated benzotriazole and the like. Examples of water-soluble high-molecular compounds are polyvinyl alcohol, cellulose derivatives, polyamine, polyimine and the like.

Examples of dye dissolving agents are urea, ϵ-caprolactam, ethylene carbonate and the like.

Examples of surface active agents are known anionic, cationic or nonionic surface-active agents.

Colored articles of the present invention are those which have been colored with a compound of the present invention. Materials which can be colored include, but not limited to, paper, fiber, fabric (cellulose, nylon, wool and the like), leather, and base material of color filter. Coloring methods which can be mentioned are dip dyeing, textile printing or screen printing, or printing with an ink jet printer. Among these coloring methods, printing with an ink jet printer is preferred.

Recording liquids which contain one or more compounds represented by the general formula (1) are particularly suitable for use in printing, copying, marking, writing, drawing, stamping or recording method, particularly in ink jet printing method. When used in the method set forth just above, high-quality black printed matters having remarkably full depth of shade as well as good resistance properties to water, light and abrasion can be obtained. Disazo compounds of the general formula (1) of the present invention exhibit improved resistance to light (color fastness to light) as compared to known dyes, particularly when applied onto special papers for ink jet printing.

Ink compositions of the present invention can be stored without suffering from separation by precipitation. In addition, ink compositions of the present invention can be used in an ink jet printer with no clogging of nozzles of a sprayer. Ink compositions of the present invention can remain in an ink jet printer without any deterioration of physical properties under constant recirculation for considerably long time or under intermittent operation of the ink jet printer.

EXAMPLES

The present invention will be described more concretely by way of following examples. Unless otherwise designated, "part" and "%" used herein are on the basis of weight.

Example 1

90.1 parts of compound of the formula (15) was dissolved in 700 parts of water under weak acidity. Then, the resultant solution was kept at a temperature of 5 to 10° C. and was subjected to diazotization by adding 79.4 parts of 35% hydrochloric acid and 13.8 parts of sodium nitrite.

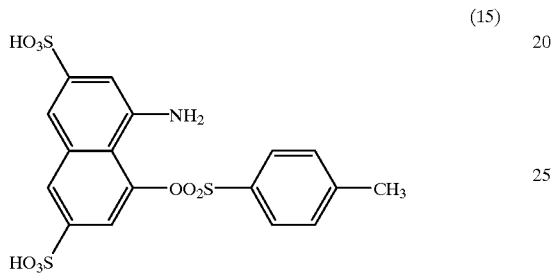

(15)

Then, the obtained diazo suspension of the formula (15) was added dropwise to a suspension of 36.3 parts of 3'-amino-4'-methoxayacetanilide in 350 parts of water at a temperature of 10 to 20° C. over about 2 hours. During the dropping, the coupling solution was kept at a pH value of 6.5 to 7.5 by adding sodium carbonate. After the dropping was finished, the reaction mixture was stirred overnight at a pH value of 6.5 to 7.5 at a temperature of 10 to 20° C., to complete the coupling reaction. Thereafter, the reaction mixture was heated to 70° C. and the pH thereof was adjusted to a value of 3.5 to 4.0 with 35% hydrochloric acid, then isolated by filtration and dried, to obtain 108.7 parts of compound of the formula (16).

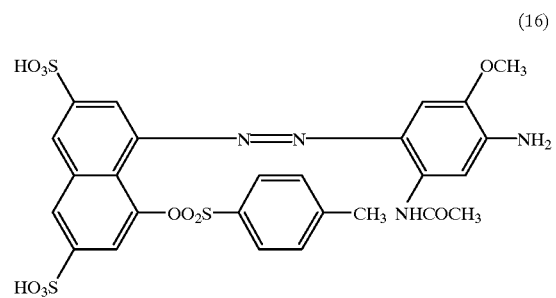

(16)

Example 2

35.2 parts of compound of the formula (16) obtained in Example 1 was dissolved in 350 parts of water. To the resultant solution, 4.4 parts of sodium nitrite was added. The obtained solution was subjected to diazotization by adding it dropwise to 50 parts of 4.5% hydrochloric acid at a temperature of 15 to 20° C. Then, the obtained diazo suspension of the formula (16) was added dropwise to an aqueous alkaline solution containing 12.8 parts of 7-amino-1-hydroxynaphthalene-3-sulfonic acid (hereinafter referred to as "Gammar acid") at a temperature of 15 to 25° C. During the dropping, the coupling solution was kept at a pH value of 8.5 to 9.5 with sodium carbonate. After the dropping was finished, the reaction mixture was stirred at a pH of 8.5 to 9.5 at a temperature of 15 to 25° C. for additional 3 hours, to complete the coupling reaction. Thereafter, the reaction mixture was subjected to salting out by adding sodium chloride and isolated by filtration, to obtain the compound of the formula (17).

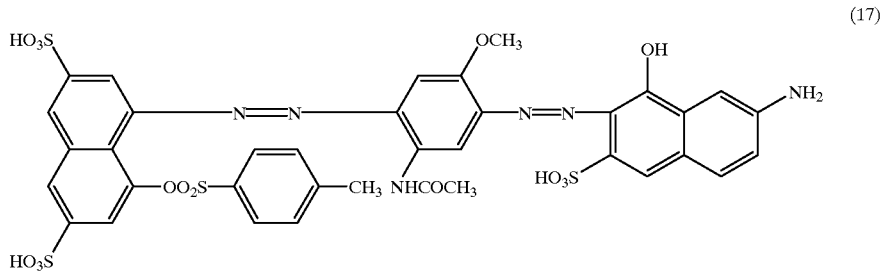

(17)

Example 3

Total amount of compound of the formula (17) obtained in Example 2 was dissolved in 350 parts of water and then heated to 85° C. After the heating, the reaction solution was adjusted to a pH value of 11 with sodium hydroxide and then kept for 3 hours at a pH value of 10.6 to 11.2 at a temperature of 80 to 85° C. Then, the reaction solution was adjusted to a pH value of about 9.0, subjected to salting out by the addition of sodium chloride and isolated by filtration, to obtain 32.2 parts of black disazo dye (compound No.1152). This dye had an absorption spectrum of λmax=590 nm in water.

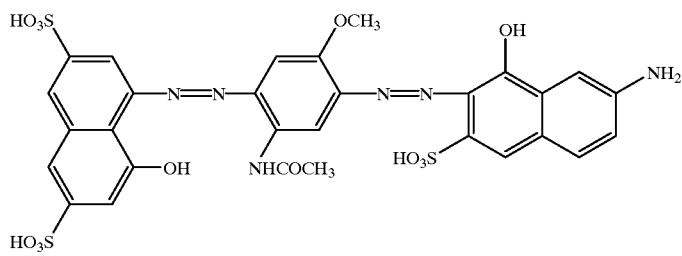

(18)

Example 4

Coupling and hydrolysis were conducted under the same conditions as those employed in Examples 2 and 3, except that Gammar acid was replaced by 13.4 parts of 7-methylamino-1-hydroxynaphthalene-3-sulfonic acid, to obtain 32.8 parts of black disazo dye of the formula (19) (compound No.1153). This dye had an absorption spectrum of λmax=572 nm in water.

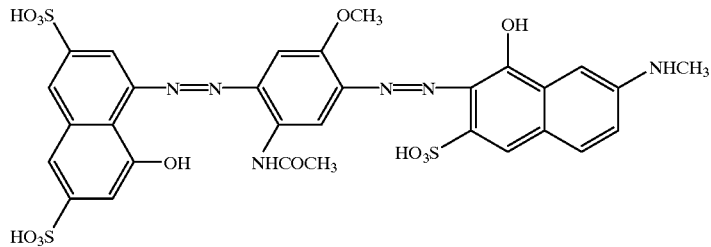

(19)

Example 5

Coupling and hydrolysis were conducted under the same conditions as those employed in Examples 2 and 3, except that Gammar acid was replaced by 19.0 parts of 7-(4-carboxyphenyl)amino-1-hydroxynaphthalene-3-sulfonic acid, to obtain 37.3 parts of black disazo dye of the formula (20) (compound No.1158). This dye had an absorption spectrum of λmax=571 nm in water.

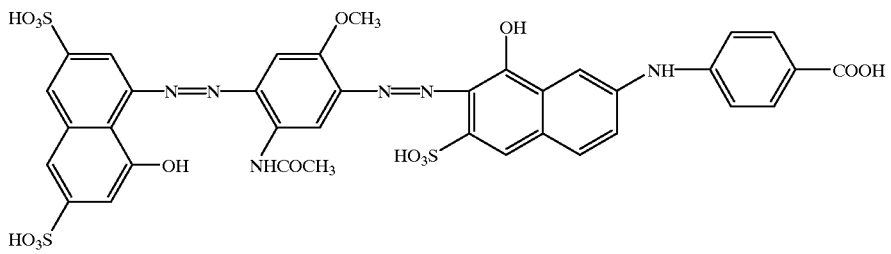

(20)

Example 6

Coupling and hydrolysis were conducted under the same conditions as those employed in Examples 2 and 3, except that Gammar acid was replaced by 16.7 parts of 6-phenylamino-1-hydroxynaphthalene-3-sulfonic acid, to obtain 35.4 parts of black disazo dye of the formula (21) (compound No.1171). This dye had an absorption spectrum of λmax=576 nm in water.

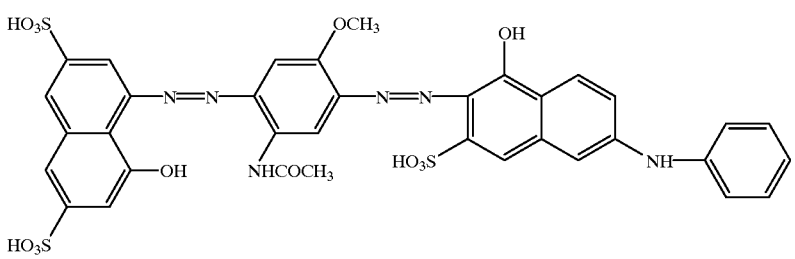

(21)

Example 7

Coupling was conducted under the same conditions as those employed in Example 1, except that 3'-amino-4'-methoxyacetanilide employed was replaced by 42.6 parts of 3'-amino-4'-(2-methoxy)ethoxyacetanilide, to obtain 107.8 parts of compound of the formula (22).

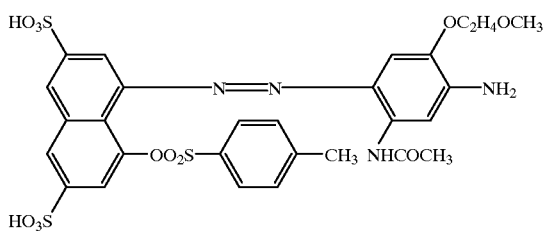

(22)

Example 8

37.5 parts of compound of the formula (22) obtained in Example 7 was dissolved in 350 parts of water. To the resultant solution, 4.4 parts of sodium nitrite was added. The obtained solution was subjected to diazotization by adding it dropwise to 50 parts of 4.5% hydrochloric acid at a temperature of 15 to 20° C. Then, the obtained diazo suspension of the formula (22) was added dropwise to an aqueous alkaline solution containing 12.8 parts of Gammar acid at a temperature of 15 to 25° C. During the dropping, the coupling solution was kept at a pH value of 8.5 to 9.5 with sodium carbonate. After the dropping was finished, the reaction mixture was stirred at a pH value of 8.5 to 9.5 at a temperature of 15 to 25° C. for additional 3 hours, to complete the coupling reaction. Thereafter, the reaction mixture was subjected to salting out by adding sodium chloride and isolated by filtration, to obtain the compound of the formula (23).

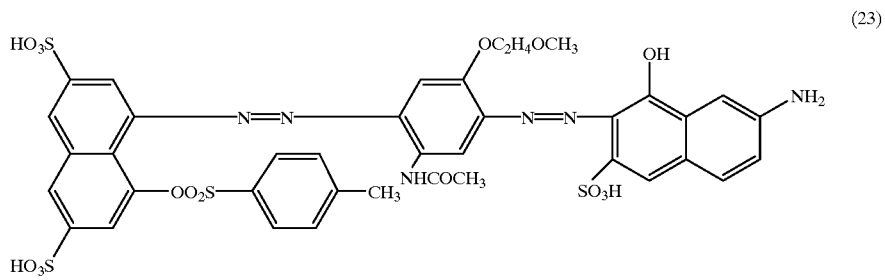

(23)

Example 9

The compound of the formula (23) obtained in Example 8 was subjected to the reaction and salting out and isolated by filtration using a procedure similar to that of Example 3, to obtain 34.1 parts of black disazo dye of the formula (24) (compound No.1204). This dye had an absorption spectrum of $\lambda$max=582 nm in water.

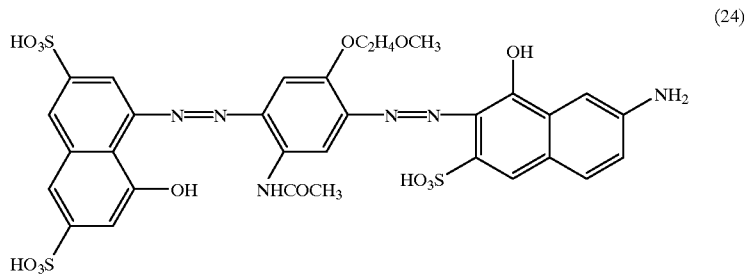

(24)

Coupling and hydrolysis were conducted in a manner similar to that described in Examples 7 and 8, except that Gammar acid was replaced by 20.9 parts of 7-(3-sulfophenyl)amino-1-hydroxynaphthalene-3-sulfonic acid, to obtain 40.7 parts of black disazo dye of the formula (25) (compound No.1209). This dye had an absorption spectrum of $\lambda$max=588 nm in water.

Example 10

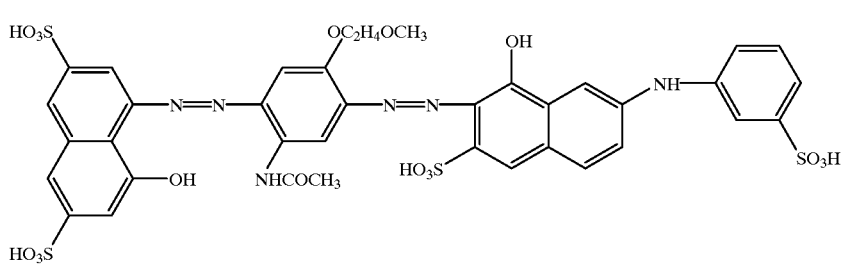

(25)

Example 11

To the diazo suspension of the formula (15) obtained in Example 1,200 parts of aqueous solution containing 26.1 parts of 2-methoxy-5-methylaniline was added dropwise at a temperature of 5 to 10° C. During the dropping, the coupling solution was kept at a pH value of 3.0 to 3.5 by adding sodium carbonate. After the dropping was finished, the reaction mixture was stirred overnight at a pH value of 3.0 to 3.5 at a temperature of 10 to 15° C., to complete the coupling reaction. Thereafter, the reaction mixture was heated to 70° C., acidified to reach a pH value of about 1.0 with 35% hydrochloric acid, isolated by filtration and dried, to obtain 101.7 parts of compound of the formula (26).

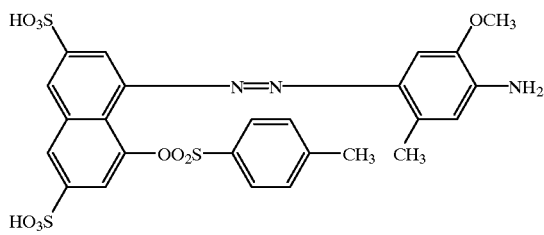

(26)

Example 12

32.9 parts of compound of the formula (26) obtained in Example 11 was subjected to the reaction and salting out and isolated by filtration in a manner similar to that described in Examples 2 and 3, to obtain 30.4 parts of black disazo dye of the formula (27) (compound No.1128). This dye had an absorption spectrum of λmax=579 nm in water.

Example 13

To the diazo suspension of the formula (15) obtained in Example 1,300 parts of aqueous solution containing 42.5 parts of 1-naphthylamine-7-sulfonic acid in water was added dropwise at a temperature of 10 to 15° C. After the dropping was finished, the pH of the coupling solution was adjusted to a value of 3.8 to 4.2 with sodium acetate. Then, the coupling solution was stirred overnight at a pH value of 4.0 to 4.5 at a temperature of 10 to 15° C., to complete the coupling reaction. Thereafter, the reaction mixture was acidified to reach a pH value of about 1.0 with 35% hydrochloric acid, isolated by filtration and dried, to obtain 115.8 parts of compound of the formula (28).

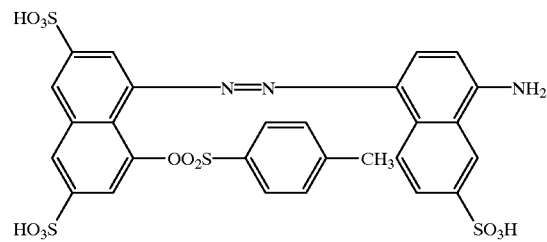

(28)

Example 14

37.5 parts of compound of the formula (28) obtained in Example 13 was subjected to the reaction and salting out and isolated by filtration in a manner similar to that of Examples 2 and 3, to obtain 34.0 parts of black disazo dye of the formula (29) (compound No.2059). This dye had an absorption spectrum of λmax=604 nm in water.

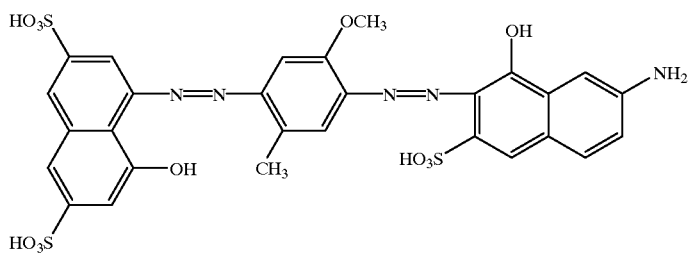

(27)

(29)

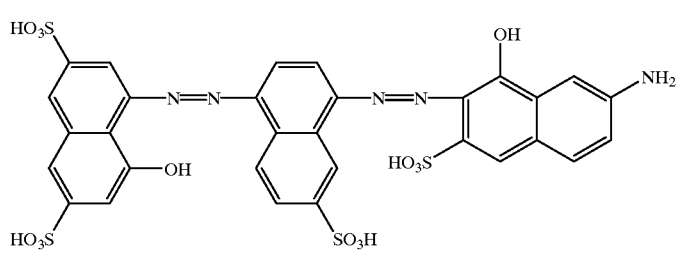

Example 15
(A) Preparation of Ink Compositions

A liquid having the following composition was prepared and was passed through a 0.45 μm membrane filter, whereby an aqueous ink composition for ink jet application was obtained.

| Composition | |
|---|---|
| Disazo compound obtained in any one of the preceding examples (desalted compound was used) | 3.0 parts |
| Water | 67.0 parts |
| Ethylene glycol | 5.0 parts |
| Glycerin | 5.0 parts |
| N-methylpyrrolidone | 7.0 parts |
| Urea | 10.0 parts |
| IPA | 3.0 parts |

(B) Ink Jet Printing

Using an ink jet printer (Trade name: NOVAJET III manufactured from ENCAD Co.), ink jet printing was carried out on papers of 3 types consisting of an ordinary paper (Canon Printer Paper A4 (TLB5A4S)), a special paper A (Color BJ PaperLC101 manufactured from CANON Co.) and a special paper B (a coated paper STX73A4 manufactured from SHARP Co., special paper for making a color image with ink jet printer). Then, the printed papers were tested for the resistance to light and water and color rendering properties of the printed images.

(C) Test for Resistance to Light of the Printed Images

Using a Carbon Arc Fade Meter (manufactured from Suga Shikenki Co.), the printed images were irradiated with light for 20 hours. Rating was assessed according to the Blue Scale standardized by JIS L-0841.

(D) Test for resistance to water of the printed images Test specimens were immersed in water contained in a beaker for 2 minutes while gently stirring. After drying the test specimens, the color fading of the printed images was estimated by visual examination in making a comparison with the untested specimens.

Color Fading
  ○ slightly faded
  Δ nearly half faded
  × greatly faded (E) Color Rendering Properties Hue change of printed matters depending on different light sources was estimated by visual examination.

Hue Change and Shading
  ○ a little
  Δ moderate
  × great

Comparative Examples 1, 2 and 3

3 types of conventional dyes used or proposed as black dye in ink jet printing were tested by way of comparative examples.

(1) Comparative Example 1

Using C. I. Food Black 2, an ink composition was prepared in a manner similar to that described in the sections (A) and (B) above, and was applied in ink jet printing.

(2) Comparative Example 2

Using Canon Black BC-20, an ink composition was prepared in a manner similar to that described in the sections (A) and (B) above, and was applied in ink jet printing.

(3) Comparative Example 3

Using EPSON Black MJIC 4C, an ink composition was prepared in a manner similar to that described in the sections (A) and (B) above, and was applied in ink jet printing. Results of evaluation tests are shown in Table 59.

TABLE 59

| | Resistance to light (Scale) | | | Resistance to water | | | |
|---|---|---|---|---|---|---|---|
| Compound. No. | Ordinary paper | Special paper A | Special paper B | Ordinary paper | Special paper A | Special Special B | Color rendering properties |
| 1152 | 5 | 5 | 5 | X ~ Δ | ○ | Δ | Δ |
| 1153 | 5 | 4 | 4–5 | X | ○ | X | Δ ~ ○ |
| 1158 | 5 | 5 | 5 | X | ○ | X | ○ |
| 1171 | 4 | 4 | 4 | X ~ Δ | ○ | Δ | Δ~ ○ |
| 1204 | 4 | 4 | 4 | Δ ~ ○ | ○ | ○ | X ~ Δ |
| 1209 | 4 | 4 | 4 | X ~ Δ | ○ | X | X |
| 1128 | 4–5 | 4–5 | 5 | Δ | ○ | ○ | ○ |
| 2059 | 4 | 4–5 | 5 | X ~ Δ | ○ | Δ | Δ |
| Comparative Example 1 | 5 | 3–4 | 5 | X | ○ | X | Δ |
| Comparative Example 2 | 4–5 | 2 | 4–5 | ○ | ○ | ○ | X |
| Comparative Example 3 | 3 | 2 | 4 | X | ○ | X | X |

As is obvious from Table 59, ink compositions comprising a compound of the present invention exhibit not only color rendering properties equal to or better than those exhibited by black dyes of prior art (Comparative Examples), but also have excellent resistance to light. In particular, these ink compositions exhibit remarkably good resistance to light when applied on special paper A for ink jet printing. In addition, it has been found that recording liquids have good storage stability and ejecting stability due to the fact that the compound is highly water-soluble.

Effect of the Invention

Recording liquids containing a disazo compound of the present invention or a salt thereof are suitable for use in ink jet printing or in writing tools. These recording liquids can reproduce a printed image with full depth of shade both on an ordinary paper and on a special paper for ink jet printing. In addition, recording liquids of the present invention exhibit excellent color rendering properties, have high resistance to light and are good in storage stability.

What we claim is:

1. A water-soluble disazo compound represented by the general formula (1):

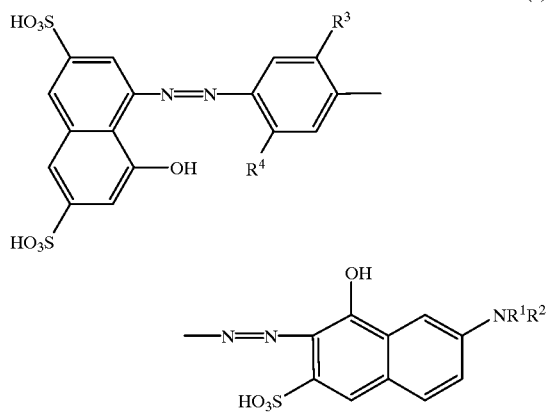

wherein each of $R^1$ and $R^2$ represents independently a hydrogen atom, a $C_1$–$C_4$ alkyl, $C_2$–$C_4$ alkanoyl or hydroxy-($C_1$–$C_4$)alkyl group or a phenyl group which may be optionally substituted with $CH_3$, OH, COOH, $SO_3H$, Cl, $NH_2$ or $OCH_3$, or a benzyl group which may be optionally substituted with Cl; each of $R^3$ and $R^4$ represents independently a $C_1$–$C_2$ alkyl, $C_1$–$C_2$ alkoxy, $C_2$–$C_4$ alkanoylamino, or ($C_1$–$C_2$)alkoxy-($C_1$–$C_2$)alkoxy group; with the proviso that $R^1$ and $R^2$ cannot both be hydrogen.

2. The water-soluble disazo compound according to claim 1, which is in the form of a lithium salt, a sodium salt, a potassium salt or an ammonium salt represented by the general formula (4):

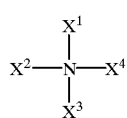

wherein each of $X^1$ and $X^4$ represents independently a hydrogen atom or a $C_1$–$C_4$ alkyl, hydroxy-($C_1$–$C_4$)alkyl or a hydroxyethoxy-($C_1$–$C_4$)alkyl group.

3. The disazo compound or the salt thereof according to claim 1 or 2, having the general formula (1) wherein $R^3$ represents a methyl, methoxy, ethoxy, or methoxyethoxy group; and $R^4$ represents a methoxy, ethoxy or acetylamino group.

4. The disazo compound or the salt thereof according to the claim 1 or 2, having the general formula (1) wherein $R^1$ represents a hydrogen atom, $R^2$ represents a phenyl group which may be optionally substituted with $CH_3$, OH, COOH, $SO_3H$, Cl, $NH_2$ or $OCH_3$, or a benzyl group which may be optionally substituted with Cl; $R^3$ represents a methyl, methoxy, or ethoxy group; and $R^4$ represents methoxy, ethoxy, or acetylamino group.

5. An aqueous ink composition comprising a disazo compound represented by the general formula (1):

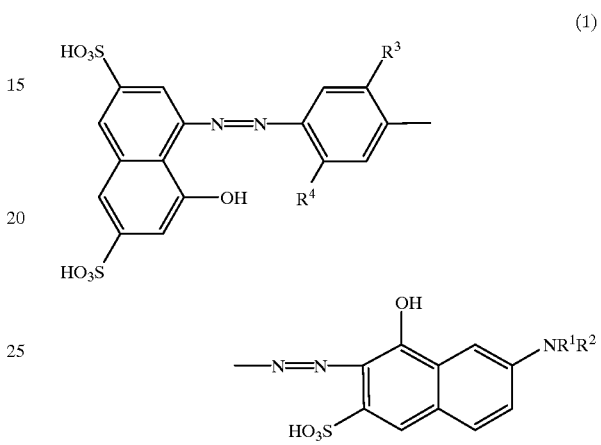

wherein each of $R^1$ and $R^2$ represents independently a hydrogen atom, a $C_1$–$C_4$ alkyl, $C_2$–$C_4$ alkanoyl or hydroxy-($C_1$–$C_4$)alkyl group or a phenyl group which may be optionally substituted with $CH_3$, OH, COOH, $SO_3H$, Cl, $NH_2$ or $OCH_3$, or benzyl group which may be optionally substituted with Cl; each of $R^3$ and $R^4$ represents independently a $C_1$–$C_2$ alkyl, $C_1$–$C_2$ alkoxy, $C_2$–$C_4$ alkanoylamino, or ($C_1$–$C_2$)alkoxy-($C_1$–$C_2$)alkoxy group; or the salt thereof.

6. A colored article colored with a disazo compound represented by the general formula (1):

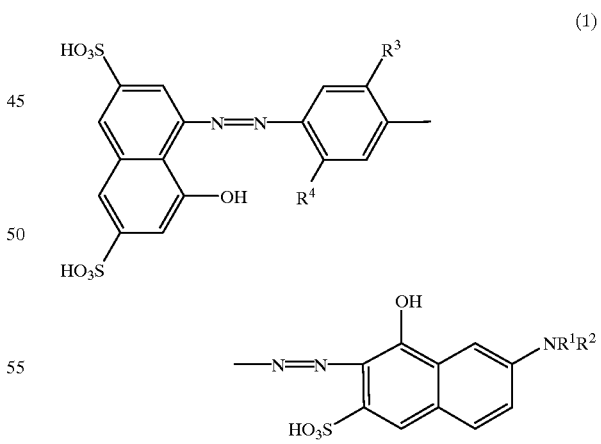

wherein each of $R^1$ and $R^2$ represents independently a hydrogen atom, a $C_1$–$C_4$ alkyl, $C_2$–$C_4$ alkanoyl or hydroxy-($C_1$–$C_4$)alkyl group or a phenyl group which may be optionally substituted with $CH_3$, OH, COOH, $SO_3H$, Cl, $NH_2$ or $OCH_3$, or a benzyl group which may be optionally substituted with Cl; each of $R^3$ and $R^4$ represents independently a $C_1$–$C_2$ alkyl, $C_1$–$C_2$ alkoxy, $C_2$–$C_4$ alkanoylamino, or ($C_1$–$C_2$)alkoxy-($C_1$–$C_2$)alkoxy group; or the salt thereof.

7. The colored article according to claim 6, which was colored by means of a printer.

8. An aqueous ink composition comprising a disazo compound represented by the general formula (1):

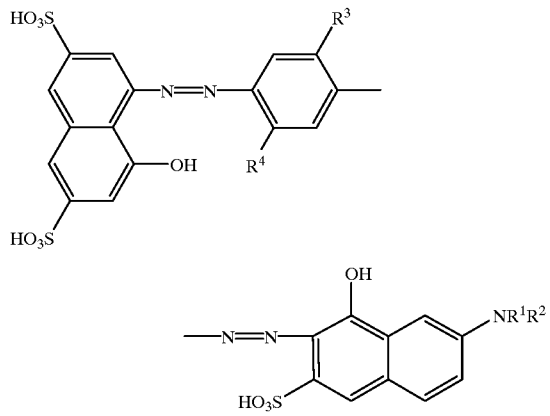

wherein $R^1$ and $R^2$ represent a hydrogen atom, $R^3$ represents a methyl, methoxy, ethoxy or methoxyethoxy group; $R^4$ represents methoxy, ethoxy or an acetylamino group; or the salt thereof.

9. An aqueous ink composition comprising a disazo compound represented by the general formula (1):

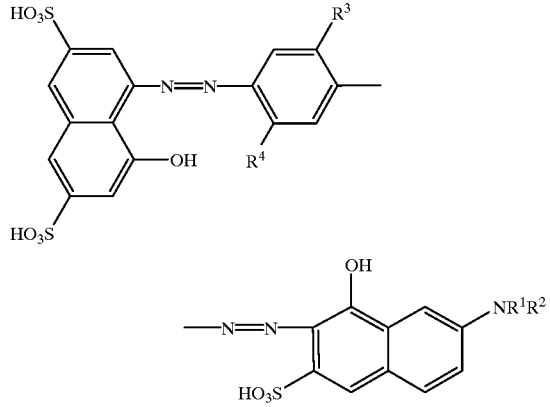

wherein $R^1$ represents a hydrogen atom, $R^2$ represents a phenyl group which may be optionally substituted with $CH_3$, OH, COOH, $SO_3H$, Cl, $NH_2$ or $OCH_3$, or benzyl group which may be optionally substituted wit Cl; $R^3$ represents a methyl, methoxy or ethoxy group; $R^4$ represents methoxy, ethoxy or an acetylamino group; or the salt thereof.

10. A colored article colored with a disazo compound represented by the general formula (1):

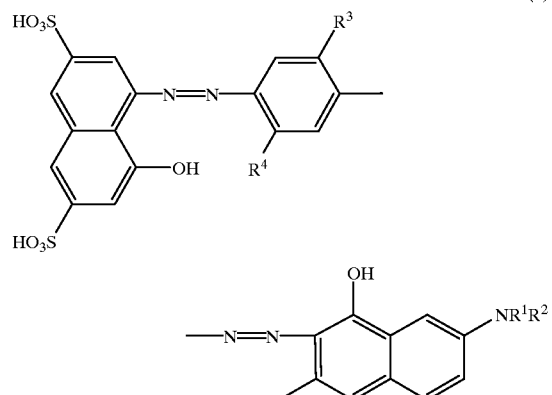

wherein $R^1$ and $R^2$ represent a hydrogen atom, $R^3$ represents a methyl, methoxy, ethoxy or methoxyethoxy group; $R^4$ represents methoxy, ethoxy or an acetylamino group; or the salt thereof.

11. A colored article colored with a disazo compound represented by the general formula (1):

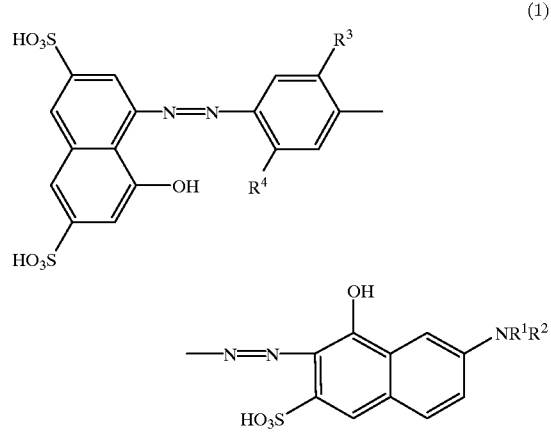

wherein $R^1$ represents a hydrogen atom, $R^2$ represents a phenyl group which may be optionally substituted with $CH_3$, OH, COOH, $SO_3H$, Cl, $NH_2$ or $OCH_3$, or benzyl group which may be optionally substituted with Cl; $R^3$ represents a methyl, methoxy or ethoxy group; $R^4$ represents methoxy, ethoxy or an acetylamino group; or the salt thereof.

12. The colored article according to claim 10, which was colored by means of a printer.

13. The colored article according to claim 11, which was colored by means of a printer.

14. The aqueous ink composition of claim 5, 8 or 9, wherein said disazo compound is in the form of a lithium salt, a sodium salt, a potassium salt or an ammonium salt represented by the general formula (4):

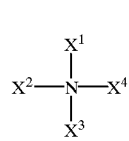 (4)

wherein each of $X^1$ and $X^4$ represents independently a hydrogen atom or a $C_1$–$C_4$ alkyl, hydroxy-($C_1$–$C_4$)alkyl or hydroxyethoxy-($C_1$–$C_4$)alkyl group.

15. The colored article of claim 6, 10 or 11, wherein said disazo compound is in the form of a lithium salt, a sodium salt, a potassium salt or an ammonium salt represented by the general formula (4):

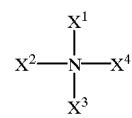 (4)

wherein each of $X^1$ and $X^4$ represents independently a hydrogen atom or a $C_1$–$C_4$ alkyl, hydroxy-($C_1$–$C_4$)alkyl or hydroxyethoxy-($C_1$–$C_4$)alkyl group.

16. The colored article according to claim 15, which was colored by means of a printer.

* * * * *

UNITED STATES PATENT AND TRADEMARK OFFICE
CERTIFICATE OF CORRECTION

PATENT NO.    : 6,143,062  
DATED         : November 7, 2000  
INVENTOR(S)   : Takashi Miyazawa, et al.

Page 1 of 1

It is certified that error appears in the above-identified patent and that said Letters Patent is hereby corrected as shown below:

<u>Foreign/PCT Application(s)</u>
JAPAN           9/94465           03/31/97

Signed and Sealed this

Twelfth Day of June, 2001

*Nicholas P. Godici*

Attest:

NICHOLAS P. GODICI
*Attesting Officer*   *Acting Director of the United States Patent and Trademark Office*